US 11,177,512 B2

(12) United States Patent
Chou et al.

(10) Patent No.: US 11,177,512 B2
(45) Date of Patent: *Nov. 16, 2021

(54) BARIUM-DOPED COMPOSITE ELECTRODE MATERIALS FOR FLUORIDE-ION ELECTROCHEMICAL CELLS

(71) Applicants: HONDA MOTOR CO., LTD., Tokyo (JP); CALIFORNIA INSTITUTE OF TECHNOLOGY, Pasadena, CA (US)

(72) Inventors: Nam Hawn Chou, Dublin, OH (US); Kaoru Omichi, Columbus, OH (US); Ryan McKenney, Upper Arlington, OH (US); Qingmin Xu, Columbus, OH (US); Christopher Brooks, Dublin, OH (US); Simon C. Jones, Azusa, CA (US); Isabelle M. Darolles, Azusa, CA (US); Hongjin Tan, Pasadena, CA (US)

(73) Assignees: HONDA MOTOR CO., LTD., Tokyo (JP); CALIFORNIA INSTITUTE OF TECHNOLOGY, Pasadena, CA (US)

(*) Notice: Subject to any disclaimer, the term of this patent is extended or adjusted under 35 U.S.C. 154(b) by 141 days.

This patent is subject to a terminal disclaimer.

(21) Appl. No.: 16/013,739

(22) Filed: Jun. 20, 2018

(65) Prior Publication Data

US 2018/0301764 A1 Oct. 18, 2018

Related U.S. Application Data

(63) Continuation-in-part of application No. 15/844,079, filed on Dec. 15, 2017.
(Continued)

(51) Int. Cl.
*H01M 4/00* (2006.01)
*H01M 10/36* (2010.01)
(Continued)

(52) U.S. Cl.
CPC .......... *H01M 10/36* (2013.01); *C01F 17/265* (2020.01); *C01F 17/30* (2020.01); *H01M 4/136* (2013.01);
(Continued)

(58) Field of Classification Search
CPC ...... H01M 4/366; H01M 4/134; H01M 4/136; H01M 4/1395; H01M 4/38; H01M 4/582;
(Continued)

(56) References Cited

U.S. PATENT DOCUMENTS 4,052,539 A   10/1977   Shropshire et al.
4,931,172 A   6/1990    Kobos et al.
(Continued)

FOREIGN PATENT DOCUMENTS

CN       103087805 A        5/2013
DE   10 2014 211 907 A1    12/2014
(Continued)

OTHER PUBLICATIONS

B.P. Sobolev et al., "Mechanochemical Synthesis of Nonstoichiometric Fluorite Ca1-xLaxF2+x Nanocrystals from CaF2 and LaF3 Single Crystals" Crystallography Reports, vol. 50, No. 3, pp. 478-435, 2005.
(Continued)

*Primary Examiner* — Raymond Alejandro
(74) *Attorney, Agent, or Firm* — Arent Fox LLP

(57) ABSTRACT

The present disclosure relates to a method of making core-shell and yolk-shell nanoparticles, and to electrodes comprising the same. The core-shell and yolk-shell nanoparticles and electrodes comprising them are suitable for use in electrochemical cells, such as fluoride shuttle batteries. The shell may protect the metal core from oxidation, including in an electrochemical cell. In some embodiments, an electrochemically active structure includes a dimensionally
(Continued)

changeable active material forming a particle that expands or contracts upon reaction with or release of fluoride ions. One or more particles are at least partially surrounded with a fluoride-conducting encapsulant and optionally one or more voids are formed between the active material and the encapsulant using sacrificial layers or selective etching. The fluoride-conducting encapsulant may comprise one or more metals. When the electrochemically active structures are used in secondary batteries, the presence of voids can accommodate dimensional changes of the active material.

9 Claims, 35 Drawing Sheets

Related U.S. Application Data

(60) Provisional application No. 62/434,611, filed on Dec. 15, 2016, provisional application No. 62/453,295, filed on Feb. 1, 2017, provisional application No. 62/676,693, filed on May 25, 2018.

(51) Int. Cl.
| | | |
|---|---|---|
| H01M 4/136 | (2010.01) | |
| H01M 4/36 | (2006.01) | |
| H01M 10/054 | (2010.01) | |
| C01F 17/30 | (2020.01) | |
| C01F 17/265 | (2020.01) | |
| H01M 4/38 | (2006.01) | |
| B82Y 30/00 | (2011.01) | |
| C01F 11/22 | (2006.01) | |
| B82Y 40/00 | (2011.01) | |

(52) U.S. Cl.
CPC .......... *H01M 4/366* (2013.01); *H01M 10/054* (2013.01); *B82Y 30/00* (2013.01); *B82Y 40/00* (2013.01); *C01F 11/22* (2013.01); *C01P 2002/54* (2013.01); *C01P 2002/72* (2013.01); *C01P 2002/85* (2013.01); *C01P 2004/03* (2013.01); *C01P 2004/04* (2013.01); *C01P 2004/80* (2013.01); *C01P 2006/40* (2013.01); *H01M 4/38* (2013.01); *H01M 2300/0034* (2013.01)

(58) Field of Classification Search
CPC ...... H01M 4/62; H01M 10/36; H01M 10/054; H01M 2300/0034; C01F 17/265; C01F 17/30; C01F 11/22; B82Y 30/00; B82Y 40/00; C01P 2002/54; C01P 2002/72; C01P 2002/85; C01P 2004/03; C01P 2004/04; C01P 2004/80; C01P 2006/40
See application file for complete search history.

(56) References Cited

U.S. PATENT DOCUMENTS

| | | | |
|---|---|---|---|
| 7,722,993 B2 * | 5/2010 | Potanin | H01M 4/0492 429/218.1 |
| 9,166,249 B2 | 10/2015 | Darolles et al. | |
| 9,705,124 B2 | 7/2017 | Walker et al. | |
| 2003/0008145 A1 | 1/2003 | Goldstein | |
| 2006/0070491 A1 | 4/2006 | Yang et al. | |
| 2009/0029237 A1 | 1/2009 | Yazami | |
| 2010/0178227 A1 | 7/2010 | Kim et al. | |
| 2010/0285358 A1 | 11/2010 | Cui et al. | |
| 2011/0143219 A1 | 6/2011 | Weiss et al. | |
| 2011/0274832 A1 | 11/2011 | Dai et al. | |
| 2012/0270231 A1 | 10/2012 | Smith et al. | |
| 2013/0078510 A1 | 3/2013 | Reynolds et al. | |
| 2013/0092885 A1 | 4/2013 | Cho et al. | |
| 2013/0122361 A1 | 5/2013 | Yazami | |
| 2013/0130109 A1 | 5/2013 | Archer et al. | |
| 2013/0133934 A1 | 5/2013 | Flores et al. | |
| 2013/0171060 A1 | 7/2013 | Vo-Dinh et al. | |
| 2013/0189574 A1 | 7/2013 | Crepel et al. | |
| 2013/0196844 A1 | 8/2013 | Keller et al. | |
| 2013/0288892 A1 | 10/2013 | Lauterbach et al. | |
| 2013/0323595 A1 | 12/2013 | Sohn et al. | |
| 2014/0377457 A1 | 12/2014 | Liu et al. | |
| 2015/0053464 A1 | 2/2015 | Jeong et al. | |
| 2015/0118496 A1 | 4/2015 | Cho et al. | |
| 2015/0155546 A1 * | 6/2015 | Yushin | H01M 4/136 427/78 |
| 2015/0194661 A1 | 7/2015 | Ju et al. | |
| 2015/0311508 A1 | 10/2015 | Cairns | |
| 2015/0328629 A1 | 11/2015 | Cho et al. | |
| 2016/0017180 A1 | 1/2016 | Schmidt et al. | |
| 2016/0029482 A1 | 1/2016 | Young et al. | |
| 2016/0043384 A1 | 2/2016 | Zhamu et al. | |
| 2016/0351896 A1 | 12/2016 | Yushin et al. | |
| 2017/0062874 A1 | 3/2017 | Jones et al. | |
| 2017/0352921 A1 | 12/2017 | Nakamoto et al. | |
| 2018/0175382 A1 | 6/2018 | Chou et al. | |
| 2018/0214945 A1 | 8/2018 | Chou et al. | |
| 2018/0301754 A1 | 10/2018 | Chou et al. | |
| 2018/0301764 A1 | 10/2018 | Chou et al. | |

FOREIGN PATENT DOCUMENTS

| | | |
|---|---|---|
| JP | 2015-8136 A | 1/2015 |
| KR | 20160047022 A | 5/2016 |
| WO | WO 2007/146453 A2 | 12/2007 |
| WO | WO 2009/157033 A2 | 12/2009 |
| WO | WO 2016/047906 A1 | 3/2016 |
| WO | WO 2017/028957 A1 | 2/2017 |
| WO | WO 2019/226663 A1 | 11/2019 |
| WO | WO 2019/246265 A1 | 12/2019 |

OTHER PUBLICATIONS

Charles J. Mcdonald et al., "Hollow latex particles: synthesis and applications" Advanced in Colloid and Interface Science, vol. 99, pp. 181-213, 2002.
David Lou et al., "Hollow Micro-Thanostructures: Synthesis and Applications", Advanced Materials, vol. 20, pp. 3987-4019, 2008.
David W. Oxtoby et al., "Electrochemistry", Principles of Modern Chemistry, 4th Edition, Saunders College Publishing pp. 401-443, 1999.
Hiroyuki Ohno, "Electrochemical Aspects of Ionic Liquids" Wiley-Interscience, New York, 2005.
Hoe Jin Hah et al. "New synthetic route for preparing the-type silica particles with metal cores" Chem. Commun., pp. 1012-1013, 2004.
J. McBreen et al., "New approaches to the design of polymer and liquid electrolytes for lithium batteries", Journal of Power Sources, vol. 89, pp. 163-167, 2000.
Lukasz Gorski et al. "Complexes of tetra-tert-hutyl-teltraazaporphine with Al(III) and Zr(IV) cations as fluoride selective ionophores" Analytica Chimica Acta 633, pp. 181-187, 2009.
Lukasz Gorski et al., "Fluoride-selective polymeric membrane electrodes based on Zr(IV)-and Al(III)-salen ionophores of various structures", Analytica Chimica Acta 655, pp. 39-46, 2010.
N. I. Sorokin et al., "Nonstoichiometric Fluorides-Solid Electrolytes for Electrochemical Devices: A Review" Crystallography Reports, vol. 52., No. 5., pp. 842-863, 2007.
Nanditha G. Nair et al., "Fluorinated Boroxin-Based Anion Receptors for Lithium Ion Batteries: Fluoride Anion Binding, Ab Initio Calculations, and Ionic Conductivity Studies", The Journal of Physical Chemistry A, vol. 113, pp. 5918-5926, May 2009.
P.J. Gellings et al., "The CRC Handbook of Solid State Electrochemistry", pp. 195-222, 1997.
Perrin Walker et al., "Handbook of Metal Etchants", CRC 1991.
PubChem. Citrate May 27, 2016. Retrieved from Internet; <URL: http://pubchem.ncbi.nlm.nih.gov/compound/citrate>. as viewed on Feb. 6, 2018.

(56) References Cited

OTHER PUBLICATIONS

Shinobu Fujihara et al., "Sol-Gel Processing of LaF3 Thin Films" Journal of the Ceramic Society of Japan vol. 106, pp. 124-126, 1998.

Shlomo Magdassi et al., "Copper Nanoparticles for Printed Electronics: Routes Towards Achieving Oxidation Stability" Materials, vol. 3, pp. 4626-4638, 2010.

Stephan Rudiger et al., "The fluorolytic sol-gel route to metal fluorides—a versatile process opening a variety of application fields", Dalton Transactions, No. 9, pp. 1117-1127, 2008.

V. Trnovcova et al., "Fluoride Solid Electrolytes", Russian Journal of Electrochemistry, vol. 45, No. 6, pp. 630-639, 2009.

William C. West et al., "Reversible Intercalation of Fluoride-Anion Receptor Complexes in Graphite", Journal of the Electrochemical Society, vol. 154, pp. A929-A936, 2007.

Written Opinion and International Search Report of related foreign application No. PCT/US2017/066800 dated Mar. 5, 2018.

M. Anji et al., "Batteries based on fluoride shuttle", Journal of Materials Chemistry, vol. 21, No. 43, pp. 17059-17062, Nov. 21, 2011.

"Lutensol(R) AO types" [online], Mar. 2014 (Mar. 2014) [retrieved on Jan. 29, 2020], retrieved from the Internet: < https://biakhim.com.ua/index.php?option=com_k2&Itemid=1174&id.901_f6cc99717606f04a2abc418ab94cc6b1&lang=ru&task=download&view=item>, 7 pp.; see entire document, especially, p. 2.

International Search Report and Written Opinion, issued by International Searching Authority in counterpart International Patent Application No. PCT/US19/64736, dated Feb. 25, 2020.

International Search Report and Written Opinion, issued by International Searching Authority in counterpart International Patent Application No. PCT/US2019/033334, dated Aug. 2, 2019, (PCT/ISA/210, PCT/ISA/220 & PCT/ISA/237).

International Search Report and Written Opinion, issued by International Searching Authority in corresponding International Application No. PCT/US2019/037994, dated Sep. 3, 2019, (PCT/ISA/210, PCT/ISA/220 & PCT/ISA/237).

Bhatia H. et al., "Conductivity Optimization of Tysonite-type La1-xBaxF3-x Solid Electrolytes for Advanced Fluoride Ion Battery", ACS Materials & Interfaces, Jun. 2017, [retrieved on Jan. 30, 2020], vo. 9, issue 28, 11 Pages Total.

International Search Report and Written Opinion, issued by the International Searching Authority in counterpart International Patent Application No. PCT/US2019/064792, dated Mar. 2, 2020.

Kim H. K. et al., "Reduction of the Work Functions of Gold by N-Heterocyclic Carbenes", Chemistry of Materials [online], Apr. 12, 2017 (Apr. 12, 2017) [retireved on Jan. 30, 2020], vol. 29, issue 8, pp. 3403-3411.

Zeb G., et al., "Surface Treatments for Controlling Solid Electrolyte Interphase Formation on Sn/Graphene Composite Anodes for High-Performance Li-Ion Batteries", Journal of Physical Chemistry C, Jul. 10, 2017 (Jul. 10, 2017) [retrieved on Jan. 30, 2020], vol. 121, issue 31, pp. 16682-16692.

Communication dated Jun. 9, 2020, from the European Patent Office in related European Application No. 17880278.1.

Luiz G. Jacobsohn et al., "Preparation and Characterization of Rare Earth Doped Fluoride Nanoparticles", Materials, vol. 3, No. 3, (2010), ISSN: 1996-1944, pp. 2053-2068.

Michelle Lukosi et al., "Recent advances in gold-metal oxide core-shell nanoparticles: Synthesis, characterization, and their application for heterogeneous catalysis", Frontiers of Chemical Science and Engineering, Higher Education Press, Heidelberg, vol. 10, No. 1, (2016), pp. 39-56.

Benjamin C-K. Tee et al., "An electrically and mechanically self-healing composite with pressure- and flexion-sensitive properties for electronic skin applications", Nature Nanotechnology, vol. 7, 2012 Macmillan Publishers Limited, (8 Pages Total), Dec. 2012.

Christene A. Smith et al., "N-Heterocyclic Carbenes in Materials Chemistry", Chem. Rev. 119, 2019 American Chemical Society, pp. 4986-5056, (2019).

F. Gschwind et al., Review: Fluoride ion batteries: Theoretical performance, safety, toxicity, and a combinatorial screening of new electrodes, Journal of Fluorine Chemistry, vol. 182, pp. 76-90, (2016).

Fan Cui et al., "Synthesis of Ultrathin Copper Nanowires Using Tris(trimethylsilyl)silane for High-Performance and Low-Haze Transparent Conductors", American Chemical Society, NANO Letters, DOI:10.1021/acs.nanolett.5b03422, (2015), (6 Pages total).

Michael A. Webb et al., "Systematic Computational and Experimental Investigation of Lithium-Ion Transport Mechanisms in Polyester-Based Polymer Electrolytes", 2015 American Chemical Society, ACS Cent. Sci. 2015, 1, pp. 198-205, (2015).

Michael A. Webb et al., Supporting Information, Chemically Specific Dynamic Bond Percolation Model for Ion Transport in Polymer Electrolytes, Macromolecules, 48, 7346 (2015), (12 Pages total).

Philippe Cordier et al., "Self-healing and thermoreversible rubber supramolecular assembly", NATURE Letters, vol. 451, 2008 Nature Publishing Group, (4 Pages Total), Feb. 21, 2008.

Thomas F. Miller, III, et al., "Designing Polymer Electrolytes for Safe and High Capacity Rechargeable Lithium Batteries", 2017 American Chemical Society, Acc. Chem. Res. 2017, 50, pp. 590-593, (2017).

\* cited by examiner

Me = Metal or Metal Alloy Core
Metal Halide or Metal Oxyhalide Shell = CeF3, CeOF, LaF3, and LaOF (illustrative examples)

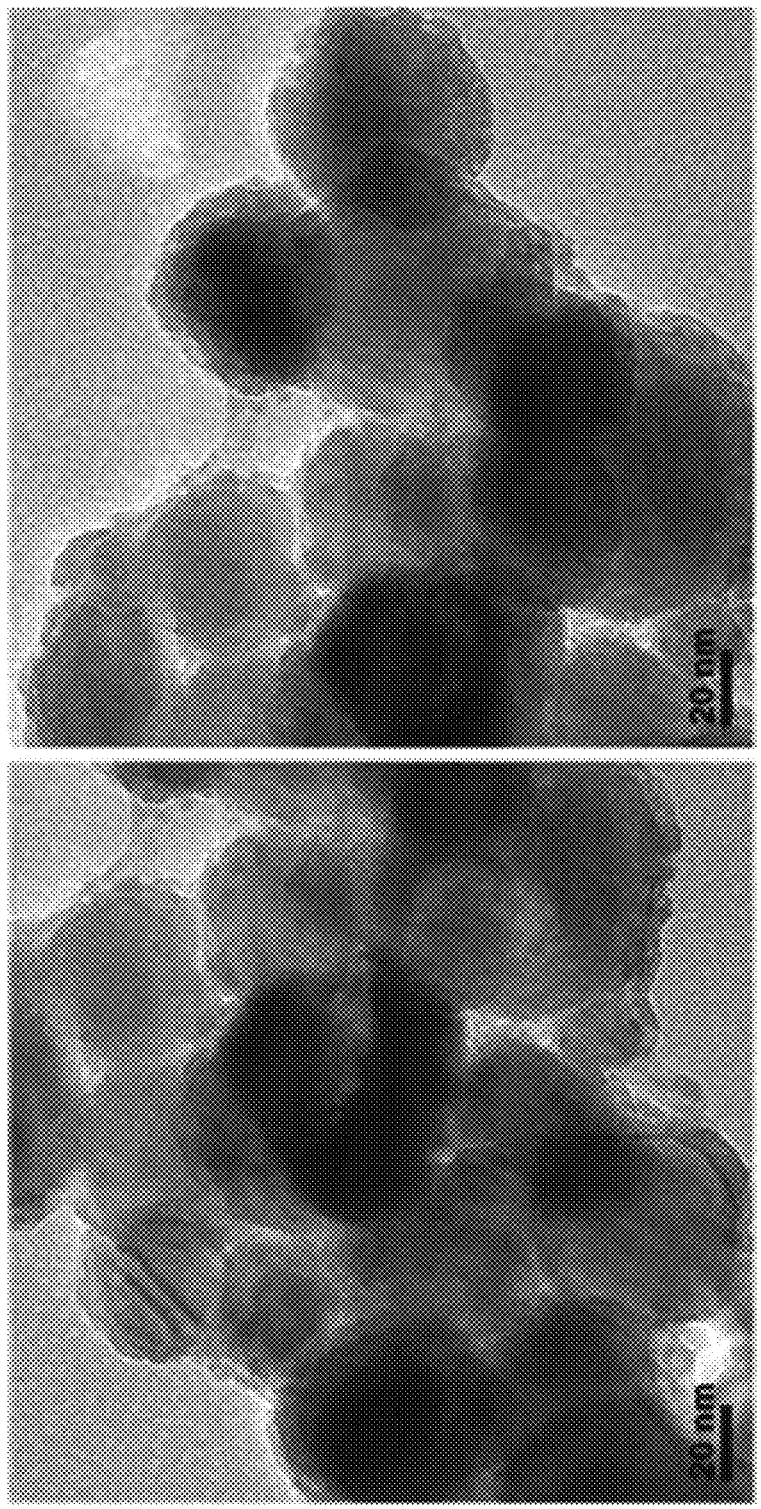

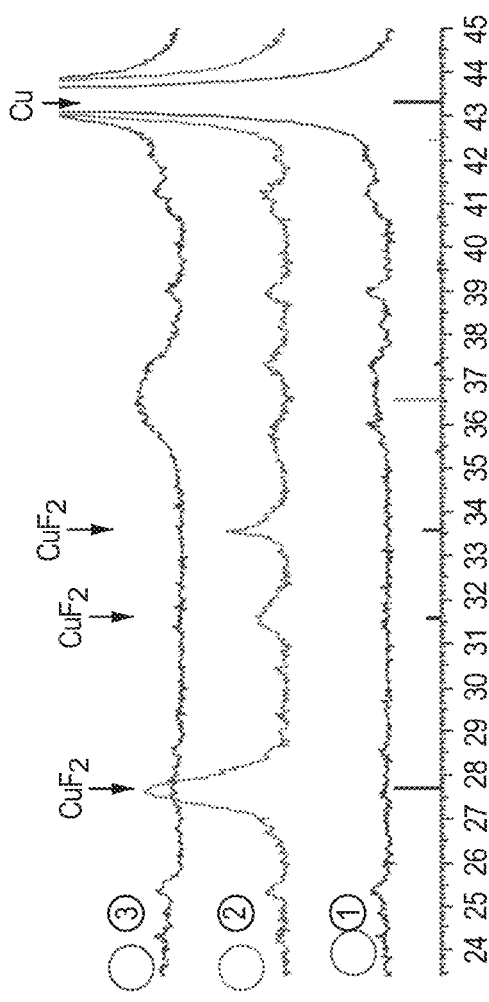
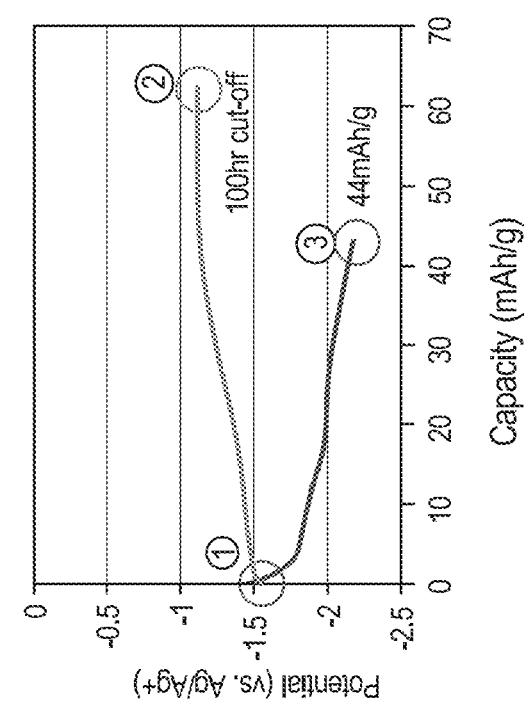
FIG. 10A
FIG. 10B
Charge reaction: $Cu + 2F^- \longrightarrow CuF_2 + 2e^-$
Discharge reaction: $CuF_2 + 2e^- \longrightarrow Cu + 2F^-$

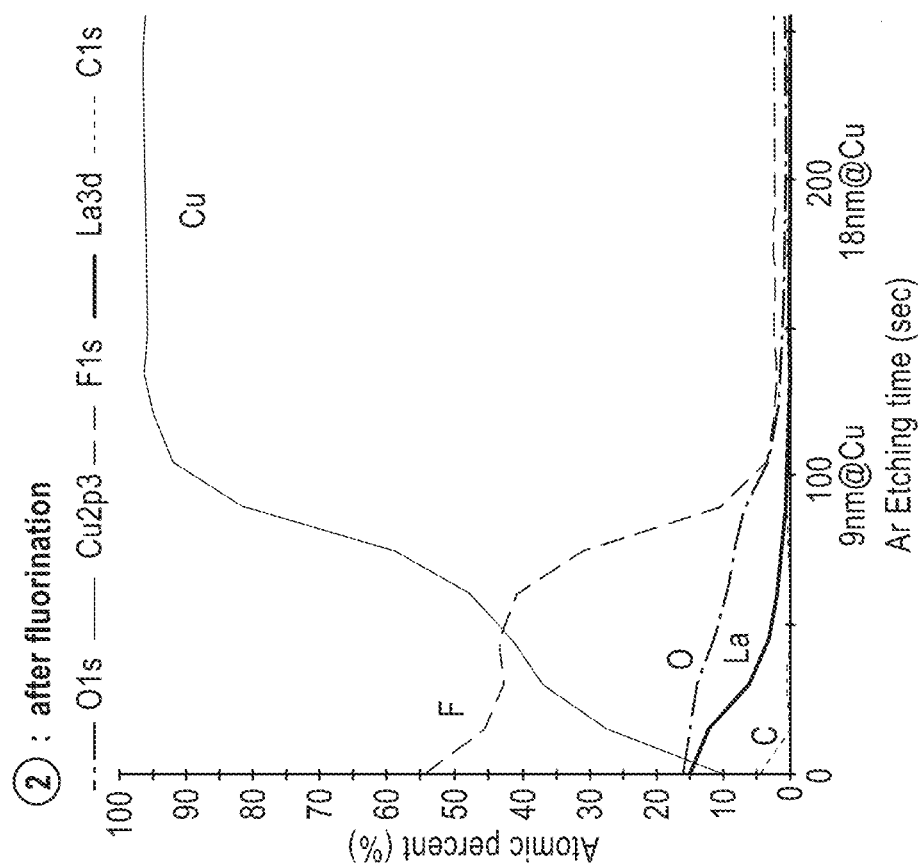
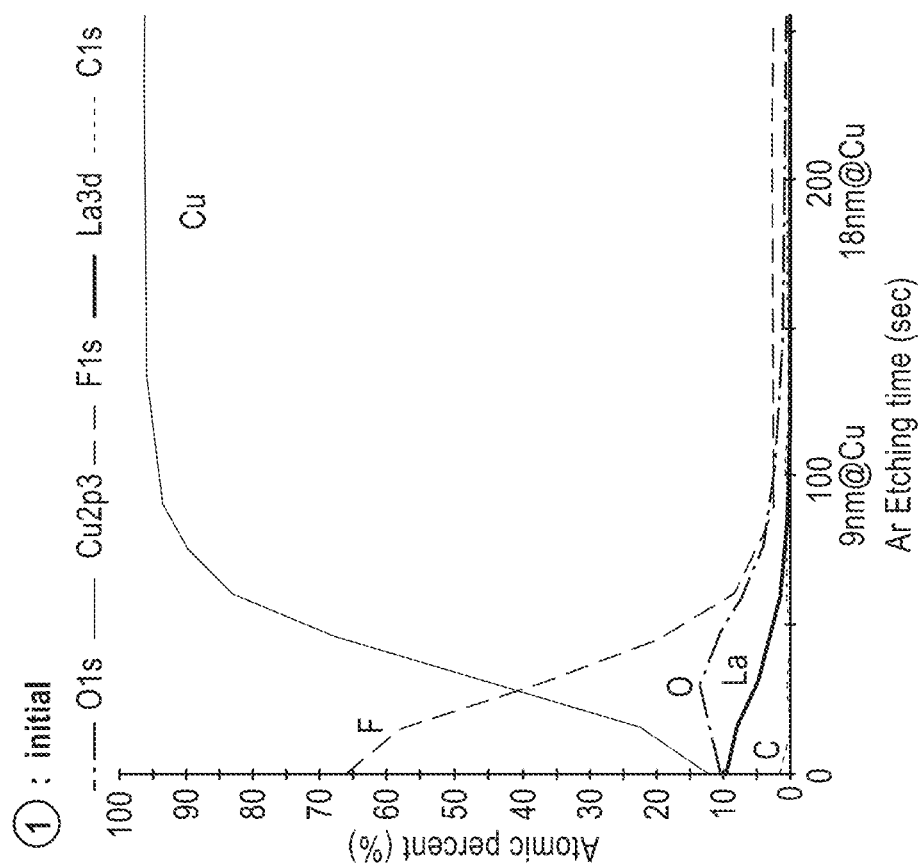
FIG. 15B
FIG. 15C

BARIUM-DOPED COMPOSITE ELECTRODE MATERIALS FOR FLUORIDE-ION ELECTROCHEMICAL CELLS

CROSS REFERENCE TO RELATED APPLICATIONS

This application is a continuation-in-part of U.S. patent application Ser. No. 15/844,079, entitled "Composite Electrode Materials for Fluoride-Ion Electrochemical Cells," filed Dec. 15, 2017, which claims priority to U.S. Patent Application No. 62/434,611, entitled "Composite Electrode Materials for Fluoride-Ion Electrochemical Cells," filed Dec. 15, 2016, and U.S. Patent Application No. 62/453,295, entitled "Core Shell," filed Feb. 1, 2017. This application also claims priority to U.S. Patent Application No. 62/676,693, entitled "Composite Electrode Materials for Fluoride-Ion Electrochemical Cells," filed May 25, 2018. Each of the preceding applications is incorporated herein by reference in its entirety.

STATEMENT REGARDING FEDERALLY SPONSORED RESEARCH OR DEVELOPMENT

This invention was made with government support under Grant No. 80NMO0018D0004, awarded by NASA Jet Propulsion Laboratory (JPL). The government has certain rights in the invention.

TECHNICAL FIELD

The present disclosure relates to electrochemically active materials, and more particularly to fluoride ion battery systems that include electrode materials with tailored structures and compositions to improve batter performance. More specifically, this disclosure relates to core-shell nanoparticles, methods for making the same, and use of the same in electrochemical cells.

BACKGROUND

Metal nanoparticles are highly desirable for use in a number of applications including as catalysts, and as electrode materials for batteries. However, the use of metal nanoparticles may be limited by the system operating conditions or other factors. For example, fluoride shuttle batteries are of growing interest as an alternative to lithium-ion batteries. However, the materials available for use in fluoride shuttle battery systems are limited, due in part to operating conditions that are detrimental to many materials that could otherwise be included in the fluoride shuttle battery electrodes.

Fluoride-ion batteries are electrochemical cells that operate via fluoride-mediated electrode reactions (i.e. accommodation or release of fluoride ions at the electrode upon charge or discharge, often through a conversion-type reaction). Such electrochemical cells can offer greater energy density, lower cost and/or improved safety characteristics compared to lithium and lithium-ion batteries. Fluoride-ion systems have been demonstrated in the solid state, for example, in U.S. Pat. No. 7,722,993 to Potanin, which describes an embodiment of a secondary electrochemical cell where fluoride ions are reversibly exchanged between anode and cathode during charge-discharge cycles, with these electrodes in contact with a solid-state fluoride-conducting electrolyte. Potanin describes solid state electrolytes containing fluorides of La, Ce or the compound fluorides based on them, together with an alloying additives, such as fluoride/fluorides of alkaline-earth metals ($CaF_2$, $SrF_2$, $BaF_2$) and/or fluorides of alkaline metals (LiF, KF, NaF) and/or alkaline metal chlorides (LiCl, KCl, NaCl), as well as a wide range of other compound fluorides. However, such electrochemical cells operate usefully only above room temperature (e.g. 150° C.) due to the limited conductivity of the solid-state electrolyte.

Attempts have also been made to provide fluoride ion-based electrochemical systems capable of using liquid electrolytes. For example, US 2011-0143219 A1 by Weiss et al. and U.S. Pat. No. 9,166,249 by Darolles et al. disclose fluoride-ion battery configurations selected to include a solvent-borne fluoride salt that is at least partially present in a dissolved state in the electrolyte. However, for many applications the chemical reactivity of the electrode materials with the liquid electrolyte is significant, and these liquid electrolyte systems do not provide sufficiently reliable high discharge and/or high capacity operation.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to an electrochemically active structure, comprising: a core comprising an active material, and a fluoride-containing shell at least partially surrounding the active material, wherein the fluoride-containing shell comprises a first metal and a second metal, and the first metal is barium.

In some embodiments, the present disclosure is directed to a method of making coated metal nanoparticles, the method comprising: a) providing a water/metal nanoparticle mixture; b) exposing the water/metal nanoparticle mixture to an inert atmosphere; and c) forming a fluoride-containing shell around a metal nanoparticle core, wherein the fluoride-containing shell comprises a first metal and a second metal, and the first metal is barium.

In some embodiments, the present disclosure is directed to an electrode comprising: a core comprising copper nanoparticles, and a fluoride containing shell at least partially surrounding the copper nanoparticles, wherein the fluoride-containing shell comprises barium and lanthanum in a ratio of x to 1-x, such that a sum of the moles of barium and the moles of lanthanum in an empirical formula of the fluoride-containing shell is 1.

In some embodiments, the present disclosure is directed to an electrochemically active structure, comprising: a core comprising an active material, and a fluoride-containing shell at least partially surrounding the active material, wherein the fluoride-containing shell comprises a first metal and a second metal, and the first metal is a divalent or tetravalent metal cation.

These and other aspects of the invention will become more fully understood upon a review of the detailed description, which follows.

BRIEF DESCRIPTION OF THE DRAWINGS

FIGS. 7A and 7B are transmission electron microscopy (TEM) images of Cu—$LaF_3$ core-shell nanoparticles of Experimental Example 1, as-made.

FIG. 10A is a plot of voltage as a function of specific capacity for electrochemical tests of a half cell battery including the Cu—$LaF_3$ core-shell nanoparticle of Experimental Example 1 as an active material in an electrode in an aspect of the present disclosure.

FIG. 10B is an X-ray diffraction spectrum of the electrode of the half cell battery test of FIG. 10A, measured under initial conditions, after discharge, and after charge.

FIGS. 15B and 15C show x-ray photoelectron spectroscopy (XPS) data for C, La, O, F, and Cu at various length of etching times at the voltages 1 and 2 indicated in FIG. 15A.

DETAILED DESCRIPTION

Figure 1A:
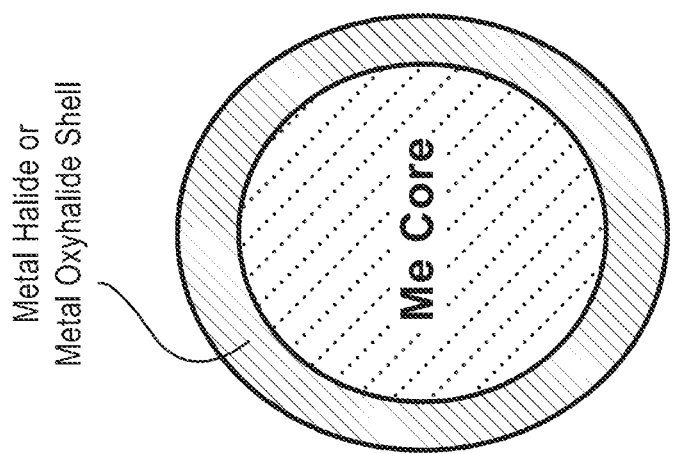
FIG. 1A shows a cross section of a core-shell nanoparticle including a core comprising a metal nanoparticle, and a shell comprising a metal halide or a metal oxyhalide in an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In general, the present disclosure is related to electrochemically active materials, and fluoride-ion battery systems that include electrode materials with tailored structures and compositions to improve battery performance. In some aspects, the present disclosure is related to core-shell nanoparticles, devices incorporating the core-shell nanoparticles, as well as methods of making and using the core-shell nanoparticles and devices including the core-shell nanoparticles.

Primary and secondary electrochemical cells, such as batteries, utilizing fluoride ion charge carriers, active electrode materials, and suitable liquid electrolytes can provide an alternative to conventional state of the art lithium batteries and lithium ion batteries. Such fluoride-ion battery (FIB) systems can operate usefully at room temperature while utilizing fluoride anions carried in a liquid electrolyte as at least some of the charge carriers in an electrochemical cell. The FIB system has an anode and cathode physically separated from each other, but in common contact with a fluoride ion conducting electrolyte. The anode is typically a low potential element or compound, and can be a metal, metal fluoride, or intercalating composition. Similarly, the cathode can be element or composition, and can be a metal, metal fluoride, or intercalating composition that has a higher potential than the anode. Fluoride ions (F$^-$) in the fluoride conducting electrolyte go from the cathode to the anode during discharge and from the anode to the cathode during the charge of the battery:

Discharge:

Anode: $MF_x + nF^- \rightarrow MF_{x+n} + ne^-$ (Fluoride ion accommodation, oxidation)

Cathode: $MF_y + ne^- \rightarrow MF_{y-n} + nF^-$ (Fluoride ion release, reduction)

During charge, the reverse reactions occur.

For example, a FIB cell reaction based on fluoride anion transfer between Ca and Cu, both metals capable of forming metal fluorides, might be:

Discharge:

$$Ca + CuF_2 \rightarrow CaF_2 + Cu$$

Charge:

$$CaF_2 + Cu \rightarrow Ca + CuF_2$$

Two major challenges exist to enable stable, reliable long-term cycling of FIB electrodes. Firstly, reversibility of the electrochemical reactions above is observed when the metal or metal fluoride active materials are nano-sized (i.e. at least one of the particle size dimensions is less than 1 μm). However, particles with such small dimensions have high surface energies and are often reactive with the electrolyte components (e.g. F$^-$) to give undesirable side-reactions including "self-discharge" (i.e. a chemical reaction such as $M + nF^- \rightarrow MF_n$ that does not general electrical current). What is needed is formation of a coating, shell, layer or the like to encapsulate the active material particles while still permitting passage of F$^-$ ions when desired (i.e. during electrochemical charge or discharge) The encapsulating material can also protect the active materials from such side-reactions, enabling long-term cycling stability of these electrode materials.

Secondly, such electrochemical reactions are conversion processes, with the structure of the metal or metal fluoride being broken down during the electrochemical process and reformed as the metal fluoride or metal, respectively, during the process. This conversion process results in a significant volume change between charged and discharged states of the active material, as indicated by the examples given in Table 1 below:

TABLE 1

Volume change for metal to metal fluoride conversion

| Metal | Metal Fluoride | Volume Change During Conversion $M + nF^- \rightarrow MF_n$ |
|---|---|---|
| Fe | FeF$_3$ | 311% |
| Pb | PbF$_2$ | 73% |
| Bi | BiF$_3$ | 134% |
| Co | CoF$_3$ | 351% |
| Cu | CuF$_2$ | 238% |

TABLE 1-continued

Volume change for metal to metal fluoride conversion

| Metal | Metal Fluoride | Volume Change During Conversion $M + nF^- \rightarrow MF_n$ |
|---|---|---|
| Sn | SnF$_2$ | 113% |
| La | LaF$_3$ | 46% |
| Ca | CaF$_2$ | −5% |
| Mg | MgF$_2$ | 42% |
| Li | LiF | −24% |

Such significant volume changes limit usefulness of conformal protective coatings encapsulating an FIB electrode material particle, since one particular state of charge will not necessarily be conformal with the particle in a different state of charge, due to the volume changes. What is needed are compositions and processes that protect the electrode active material from side reactions with the electrolyte, allow ion conduction through an encapsulant, and have sufficient void space within the encapsulant and/or encapsulant expansion/contraction properties to accommodate the volume changes of the active material during charge and discharge without permitting direct contact between the active material and the electrolyte. In some embodiments, sufficient void space may be no void space. Such compositions and their preparation are outlined below.

As used herein, the term "about" is defined to being close to as understood by one of ordinary skill in the art. In one non-limiting embodiment, the term "about" is defined to be within 10%, preferably within 5%, more preferably within 1%, and most preferably within 0.5%.

Figure 2:
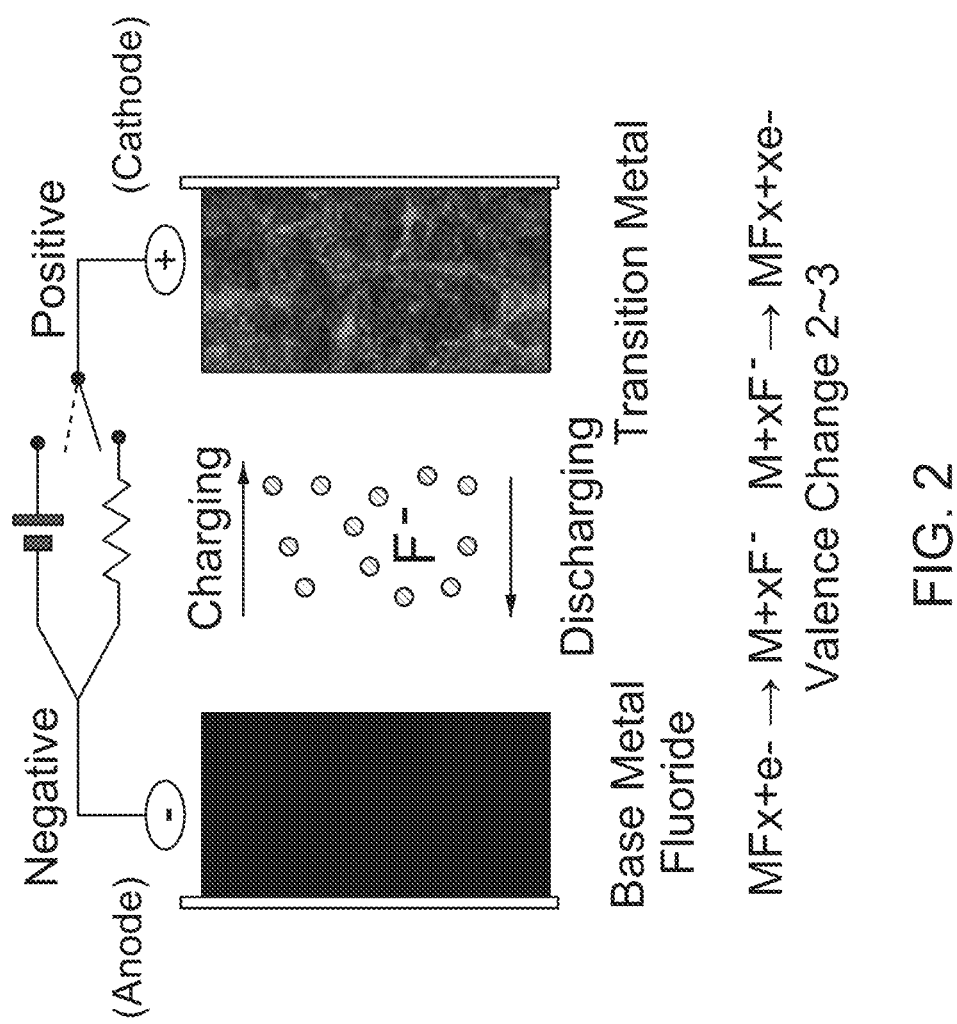
FIG. 2 is a schematic illustration of a fluoride ion electrochemical cell in an aspect of the present disclosure.

In some embodiments as shown in FIG. 1A, the core-shell nanoparticles include a core that comprises a metal or metal alloy ("Me"), and a shell that comprises a metal halide or a metal oxyhalide. The metal of the core may be the same as the metal of the metal halide shell. In some embodiments, the metal of the core and the metal of the metal halide or metal oxyhalide shell are different metals. In some embodiments, the metal halide shell may itself comprise two metals. The core-shell nanoparticles of the present disclosure may be incorporated into a variety of methods and applications including, but not limited to, electrodes for use in electrochemical cells, including fluoride shuttle batteries as shown in FIG. 2.

The metals or metal alloys used to form the core include, but are not limited to, iron nanoparticles, cobalt nanoparticles, nickel nanoparticles, copper nanoparticles, lead nanoparticles, and alkaline earth metal nanoparticles. In a preferred embodiment, the metal nanoparticles are selected from the group consisting of cobalt nanoparticles and copper nanoparticles. In another preferred embodiment, the metal nanoparticles are copper nanoparticles. The metals used to form the core may be synthesized by mixing a metal precursor solution with a reducing agent to form metal nanoparticles.

In some embodiments, the metal nanoparticles used to form the core may be synthesized in the presence of a stabilizer that prevents or otherwise inhibits oxidation of the metal nanoparticles during synthesis, and is readily removable from the metal nanoparticles prior to formation of the metal halide or metal oxyhalide shell thereon. For example, bulky polymers such as polyvinylpyrrolidone (molecular weight of 55,000 g/mol) used during metal nanoparticle synthesis inhibit oxidation of metal nanoparticles. However, such stabilizers are not readily removable from the metal nanoparticles following synthesis. Without being limited to any particular theory, residual stabilizer can form an additional layer between the core formed by the metal nanoparticles and the metal halide or oxyhalide shell that detracts from the performance of the core-shell nanoparticle in the desired system. For example, it is desirable to maintain the conductivity of core-shell nanoparticles used as electrode material in an F-Shuttle battery. However, core-shell materials including an additional layer of residual stabilizer between the core and the shell will likely result in an increased space between electrode materials; the additional layer of residual stabilizer and/or the resulting increased space may decrease the conductivity of the core-shell material. Without wishing to be bound to any particular theory, the additional layer of stabilizer may impede contact between the core and the shell to conduct fluoride ion, while the absence of the stabilizer may increase the likelihood of conducting fluoride ion from the core to the shell.

Therefore, a stabilizer may be used in the synthesis of the metal nanoparticles used to form the core that is readily removable therefrom to minimize the amount of stabilizer on the surface of the core prior to formation of the metal halide or metal oxyhalide shell directly thereon. In a non-limiting example, the one or more stabilizers that may be used in the synthesis of the metal nanoparticles includes a molecular weight (either individually or a weight average) of less than 1000 g/mol, optionally less than 500 g/mol, optionally less than 375 g/mol, and optionally less than 350 g/mol. Illustrative examples include hexadecyltrimethylammonium bromide (CTAB) with a molecular weight of 364 g/mol, citric acid with a molecular weight of 192 g/mol, and mixtures thereof.

In some embodiments, the shell of the core-shell nanoparticles may be formed by mixing isolated metal nanoparticles used to form the core with, for example, a metal salt solution and a halide salt solution that react to form the metal halide shell on the core. The shell is deposited directly on the metal core and may entirely surround the core as shown in FIG. 1A. In some embodiments, the metal salt used to form the shell is selected from the group consisting of alkali metal salts, alkaline earth metal salts, and transition metal salts. In certain embodiments, the metal salt used to form the shell is a transition metal salt. In certain embodiments, the metal salt used to form the shell is selected from the group consisting of lanthanum salts, cerium salts, and magnesium salts. In certain embodiments, the metal salt used to form the shell is selected from the group consisting of lanthanum salts and cerium salts. In certain embodiments, the metal salt is a lanthanum salt. In a preferred embodiment, the lanthanum salt is lanthanum nitrate. In some embodiments, the halide salt is sodium fluoride. In a non-limiting example, the shell comprises a metal fluoride or metal oxyfluoride containing material (i.e. $CeF_3$, CeOF, LaOF, $LaF_3$).

In some embodiments, the metal salt solution comprises two metal salts. In some such embodiments, one of the two metal salts is a barium salt. In some embodiments, the metal salt solution comprises a barium salt and a lanthanum salt. In some embodiments, the metal salt solution comprises barium nitrate and lanthanum nitrate. In some embodiments, the metal salt solution comprises barium nitrate and lanthanum nitrate in a ratio of about 1:10.

In other embodiments, the core (or electrode active material) may be separated from the shell (or encapsulant) by a void space. Compositions and processes according to such embodiments may protect the electrode active material from side reactions with the electrolyte, allow ion conduction through an encapsulant, and have sufficient void space within the encapsulant and/or encapsulant expansion/contraction properties to accommodate the volume changes of the active material during charge and discharge, without permitting direct contact between the active material and the electrolyte.

The terms core and electrode active material are used interchangeably herein. Similarly, the terms shell and encapsulant are used interchangeably herein.

In other embodiments, the present disclosure is directed to an electrode comprising the core-shell nanoparticles disclosed herein. All aspects and embodiments described with respect to the core-shell nanoparticles and methods of making thereof apply with equal force to the electrode. In a non-limiting example, the electrode is part of an F-shuttle battery system.

In some embodiments, the present disclosure is directed to an electrochemically active structure, comprising: a core comprising an active material, and a fluoride-containing shell at least partially surrounding the active material, wherein the fluoride-containing shell comprises a first metal and a second metal, and the first metal is barium. All aspects described with respect to the aforementioned embodiments apply to the present embodiment with equal force, and vice versa.

In some aspects, the active material comprises metal nanoparticles selected from iron nanoparticles, cobalt nanoparticles, nickel nanoparticles, copper nanoparticles, lead nanoparticles, and alkaline earth metal nanoparticles.

In some aspects, the active material comprises copper nanoparticles.

In some aspects, the fluoride-containing shell is directly attached to the core.

In some aspects, the fluoride-containing shell is spaced from the core so as to define a void space therebetween.

In some aspects, the second metal is lanthanum.

In some aspects, the barium and the lanthanum are present in a ratio of x to 1-x, such that a sum of the moles of barium and the moles of lanthanum in an empirical formula of the fluoride-containing shell is 1.

In some aspects, x is about 0.03 to about 0.15.

In some aspects, x is about 0.03.

In some embodiments, the present disclosure is directed to a method of making coated metal nanoparticles, the method comprising: a) providing a water/metal nanoparticle mixture; b) exposing the water/metal nanoparticle mixture to an inert atmosphere; and c) forming a fluoride-containing shell around a metal nanoparticle core, wherein the fluoride-containing shell comprises a first metal and a second metal, and the first metal is barium. All aspects described with respect to the aforementioned embodiments apply to the present embodiment with equal force, and vice versa.

In some aspects, the metal nanoparticles comprise iron nanoparticles, cobalt nanoparticles, nickel nanoparticles, copper nanoparticles, lead nanoparticles, or alkaline earth metal nanoparticles.

In some aspects, the metal nanoparticles comprise copper nanoparticles.

In some aspects, the fluoride-containing shell is directly attached to the core.

In some aspects, the fluoride-containing shell is spaced from the core so as to define a void space therebetween.

In some aspects, the second metal is lanthanum.

In some aspects, the barium and the lanthanum are present in a ratio of x to 1-x, such that a sum of the moles of barium and the moles of lanthanum in an empirical formula of the fluoride-containing shell is 1.

In some aspects, x is about 0.03 to about 0.15.

In some aspects, the forming the fluoride-containing shell comprises adding a first metal salt, a second metal salt, and a fluoride-containing salt to the water/metal nanoparticle mixture to create a fluoride-containing shell around the metal nanoparticle core, wherein the first metal is a barium salt.

In some aspects, the second metal is a lanthanum salt.

In some aspects, the first metal salt is barium nitrate and the second metal salt is lanthanum nitrate.

In some aspects, the barium nitrate and the lanthanum nitrate are used in a molar ratio of about 1:10.

In some embodiments, the present disclosure is directed to an electrode comprising: a core comprising copper nanoparticles, and a fluoride containing shell at least partially surrounding the copper nanoparticles, wherein the fluoride-containing shell comprises barium and lanthanum in a ratio of x to 1-x, such that a sum of the moles of barium and the moles of lanthanum in an empirical formula of the fluoride-containing shell is 1. All aspects described with respect to the aforementioned embodiments apply to the present embodiment with equal force, and vice versa.

In some aspects, x is about 0.03 to about 0.15.

In some aspects, the present disclosure is directed to a fluoride shuttle battery comprising the electrode and a liquid electrolyte.

In some embodiments, the present disclosure is directed to an electrochemically active structure, comprising: a core comprising an active material, and a fluoride-containing shell at least partially surrounding the active material, wherein the fluoride-containing shell comprises a first metal and a second metal, and the first metal is a divalent or tetravalent metal cation. All aspects and embodiments described with respect to the aforementioned embodiments apply to the present embodiment with equal force, and vice versa. The fluoride-containing shell may be doped with barium (i.e., to make a barium-doped shell) or with any possible divalent or tetravalent metal cation (i.e., to make a divalent metal cation-doped shell or a tetravalent metal cation-doped shell); in other words, the doping is not limited to doping with barium.

An "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof.

A "reducing agent" is a substance that causes the reduction of another substance, while it itself is oxidized. Reduction refers to a gain of electron(s) by a chemical species, and oxidation refers to a loss of electron(s) by a chemical species.

A "metal salt" is an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

A "halide salt" is an ionic complex in which the anion(s) is(are) halide ion(s), including but not limited to fluoride ion(s), chloride ion(s), bromide ion(s), and iodide ion(s). A "fluoride salt" is an ionic complex in which the anion(s) is(are) fluoride ion(s). According to the present disclosure, the cation of the halide salt or the fluoride salt may be any positively charged chemical species.

A "metal fluoride" is an ionic complex in which the cation is one or more metal ion(s) and the anion(s) is(are) fluoride ion(s). According to some aspects of the present disclosure, the metal salt(s) and the fluoride salt react to create a metal fluoride shell around the metal nanoparticle core. Similarly, a "metal halide" is an ionic complex in which the cation is one or more metal ion(s) and the anion(s) is(are) halide ion(s).

A "fluoride-containing" salt is an ionic complex in which the anion(s) contain fluoride ion but are not limited to being solely fluoride. Instead, "fluoride-containing" salts include ionic complexes where the anion(s) contain fluoride itself in complex with other ions or atoms. "Fluoride-containing" salts suitable for use in aspects of the present disclosure include those known to persons of ordinary skill in the art, including, but not limited to, fluoride salts, non-metal fluoroanions such as tetrafluoroborate salts and hexafluorophosphate salts, and oxyfluoride salts. In some aspects of the present disclosure, the fluoride-containing salts may include quaternary ammonium fluorides and fluorinated organic compounds. According to some aspects of the present disclosure, the metal salt and the fluoride-containing salt react to create a fluoride-containing shell around the metal nanoparticle core.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science, including thin electrode designs, such as thin film electrode configurations. Electrodes are manufactured as known in the art, including as disclosed in, for example, U.S. Pat. No. 4,052,539, and Oxtoby et al., Principles of Modern Chemistry (1999), pp. 401-443.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries, and electrolysis systems. General cell and/or battery construction is known in the art (see, e.g., Oxtoby et al., Principles of Modern Chemistry (1999), pp. 401-443).

"Electrolyte" refers to an ionic conductor which can be in the solid state, the liquid state (most common), or more rarely a gas (e.g., plasma).

I. Core-Shell Nanoparticle Comprising a Metal Core and a Metal Halide or Metal Oxyhalide Shell In an embodiment, a core-shell nanoparticle is provided that comprises a metal core that is surrounded by a metal halide or a metal oxyhalide shell.

In an illustrative example, the core-shell nanoparticle may be included in an electrode of a rechargeable battery, such as an F-shuttle battery. For example, it is difficult to use metal nanoparticles in the electrode of an F-shuttle battery as the metal is exposed to conditions that lead to undesired oxidation or dissolution of the metal. Accordingly, a halide shell is provided that is tailored to protect the metal core nanoparticle from the environment of the electrode while maintaining the desired performance of the metal nanoparticle. In a non-limiting example, the core may comprise copper metal and the shell may comprise $LaF_3$. In another non-limiting example, the core may comprise copper metal, and the shell may comprise $Ba_xLa_{1-x}F_{3-x}$.

A method of making the core-shell nanoparticle may comprise providing a first mixture comprising a metal nanoparticle and a reducing agent, and mixing the first mixture with a solution comprising one or more metal salts and a halide salt to form a metal halide or oxyhalide shell on the metal nanoparticles. In a non-limiting example, the solution comprises a metal salt and a halide salt. In another non-limiting example, the solution comprises two metal salts and a halide salt. In some such examples, one of the two metal salts is a barium salt. In other such examples, the two metal salts comprise a barium salt and a lanthanum salt.

I(a). Synthesis and Isolation of the Metal Core

In general, metal nanoparticles for use as the metal core may be synthesized by reacting a metal salt solution with a reducing agent in the presence of one or more stabilizers. In an illustrative example, the metal salt solution comprises a copper (II) nitrate hemipentahydrate ($Cu(NO_3)_2.2.5H_2O$) as the metal salt. The metal salt is mixed with CTAB and water, and the pH of the mixture may be adjusted to a pH of about 10-11, with for example, ammonium or sodium hydroxide.

Prior to addition of the reducing agent to the metal salt solution, the reducing agent may be mixed with one or more stabilizers and water, and mixed for a period of time, such as twenty minutes, prior to combining with the metal salt solution. The reducing agent is selected from the group consisting of hydrazine, sodium borohydride, sodium cyanoborohydride, sodium dithionate, sodium dithionite, iron (II) sulfate, tin (II) chloride, potassium iodide, oxalic acid, formic acid, ascorbic acid, thiosulfate salts, dithionate salts, phosphorous acid, phosphite salts, and hypophosphite salts. In a preferred embodiment, the reducing agent is hydrazine.

The metal salt solution and the reducing agent are combined to form the metal nanoparticles. Synthesis of the metal nanoparticles is performed in an atmosphere free of oxygen. Illustrative examples of atmospheres free of oxygen include, but are not limited to, nitrogen, argon, helium, hydrogen, and mixtures thereof. Following synthesis, the metal nanoparticles are isolated from the synthesis solution. It is to be understood that the method of isolating the metal nanoparticles is not limited, and may include one or more techniques such as filtering, decanting, and centrifuging. The metal nanoparticles may be washed one or more times with a solvent, such as ethanol, to remove any residual stabilizer or other organic material from the surface thereof.

I(b) Shell Formation

In general, the isolated metal nanoparticles may be redispersed in an aqueous solution containing additional reducing agent under an atmosphere that is free of oxygen. The mixture containing the isolated metal nanoparticles and reducing agent is then mixed under an atmosphere free of oxygen with a metal salt solution and a halide salt solution used to form the metal halide shell on the metal nanoparticle core. The metal salt solution and the fluoride salt solution used to form the shell may be added sequentially to the nanoparticle mixture, or the metal salt solution and the fluoride salt solution used to form the shell may be added simultaneously to the nanoparticle mixture. In some aspects, the metal salt solution comprises a single metal salt. In other aspects, the metal salt solution comprises two metal salts. In some such aspects, the metal salt solution comprises a barium salt. In some such aspects, the metal salt solution comprises a barium salt and a lanthanum salt. In some such aspects, the metal salt solution comprises barium nitrate and lanthanum nitrate. In some such aspects, the metal salt solution comprises barium nitrate and lanthanum nitrate in a ratio of about 1:10.

II "Yolk-Shell" Nanoparticles (i) Protective, Fluoride Ion-Conducting Coatings

Useful protective encapsulating coatings include fluoride-ion conducting phases that are chemically and electrochemically stable in the presence of a liquid FIB electrolyte. Such phases permit the exchange of F− between the electrolyte and the active material. Suitable phases are known in the art and are described, for example, in "The CRC Handbook of Solid State Electrochemistry", Chapter 6 (CRC, 1997, P. J. Gellings and H. J. M. Bouwmeester, Eds.), Sorokin and Sobolev, Crystallography Reports 2007, 52, 5, 842-863, Sobolev et. al., Crystallography Reports 2005, 50, 3, 478-485, and Trnovcova et. al., Russian Journal of Electrochemistry, 2009, 45, 6, 630-639. These include, for example, crystalline phases such as $LaF_3$, $CaF_2$, $SnF_2$, $PbF_2$, $PbSnF_4$, analogous doped and/or solid solution phases (e.g. $La_{0.9}Ba_{0.1}F_{2.9}$, $Ca_{0.8}Y_{0.2}F_{2.2}$, $Ca_{0.5}Ba_{0.5}F_2$, and $Pb_{0.75}Bi_{0.25}F_{2.25}$), glassy phases such as $35InF_3.30SnF_2.35PbF_2$, and mixed fluoride/other anion phases such as LaOF. For the purposes of this disclosure, any material or phase that permits the exchange of F− between the electrolyte and the active material, with bulk ionic conductivity above 10-10 S/cm at 298K is within the scope of the invention. These phases are chosen with constituents selected to be electrochemically stable at the potentials required for reaction of the species contained within the coatings by considering the standard redox potentials of the shell constituents and the inner species available in standard texts. See the example of FIG. 1G for a more detailed discussion of the selection of coating constituents in this regard.

Alternative protective coatings include polymers that are conducting for fluoride ions, for example boronate-functionalized polymers, alkylammonium-functionalized polymers, or those featuring suitable functional groups such as those described in Gorski et. al., Anal. Chim. Acta 2009, 633, 181-187 and Gorski, et al., Anal. Chim. Acta 2010, 665, 39-46

The thickness of the protective coating is chosen so that exchange of F− between the electrolyte and the active material occurs on a timescale such that charge/discharge of the electrochemical cell can be achieved at suitable rates of operation around 298K (e.g C-rate, corresponding to full charge or discharge of the energy stored in the electrochemical cell in one hour), and will depend on the ionic conductivity of the coating material or phase. For example, a coating of $LaF_3$ or $Ba_xLa_{1-x}F_3$, is most usefully between 1-200 nm thick, such as between about 5 nm and about 20 nm thick, or any integer or subrange in between. More generally, the coating thickness can be from about 1 nm to about 1 μm.

The coating can be made by any suitable method of synthesis. These may include solution chemistry techniques such as the formation of the coating by precipitation of a solid from a solution containing the fluoride or its constituent precursors, sol-gel or other soft chemistry or "chimie douce" methods, hydrothermal synthesis, vacuum methods such as chemical vapor deposition, physical vapor deposition, sputtering, laser ablation and molecular beam epitaxy, electrochemical deposition, or fluorination of a material after deposition by reaction with a fluorine source. For example, one preferred method for the preparation of a $LaF_3$ coating is a sol-gel synthesis similar to those described in Rudiger and Kemnitz, Dalton Trans., 2008, 1117-1127 and Fujihara et al., J. Ceram. Soc. Japan, 1998, 106, 124-126, using soluble lanthanum and fluorine sources in a suitable solvent (for example, $La(CH_3COO)_3$ and $CF_3COOH$ in water). The coating as prepared may, optionally, be subjected to elevated temperature either in air or inert gas such as Ar for an annealing step, as desired. For example, a $LaF_3$ coating prepared by the sol-gel method may be heated to 500° C. in air to anneal the coating and assist with removal of impurities such as solvent. In this manner, fluoride-conducting coating phases may be synthesized as desired by adjusting the precursor materials, their stoichiometric ratios, and the post-initial reaction annealing step. This sol-gel synthesis of the $LaF_3$ coating may also modified to prepare a coating of $Ba_xLa_{1-x}F_{3-x}$, by methods known to those of ordinary skill in the art.

In another example, the $LaF_3$ coating can be obtained from precipitation, by slowly adding $NH_4F$ into $La(NO_3)_3$ aqueous solution with nanoparticles of the core material suspended therein. Since $LaF_3$ is extremely insoluble in water, its crystallization will start on the surface of the suspended nanoparticles. The precipitation synthesis of the $LaF_3$ coating may also be modified to prepare a coating of $Ba_xLa_{1-x}F_3$, by methods known to those of ordinary skill in the art.

Alternatively, a sol-gel approach can be used to make a $La_2O_3$ coating, followed by post-fluorination using $F_2$ or HF to convert a substantial portion of this oxide to LaOF and/or $LaF_3$. This sol-gel approach may also be used to prepare a coating of $Ba_xLa_{1-x}F_{3-x}$, by methods known to those of ordinary skill in the art.

Fluoride-conducting encapsulants and/or coating phases and materials may be prepared on a three-dimensional structure (e.g. a metal or metal fluoride nanoparticle, or aggregate of nanoparticles), a two-dimensional structure (e.g. a metal or metal fluoride thin film), or a one-dimensional structure (e.g. a fiber or tube of metal or metal fluoride) as required. Similarly, fluoride-conducting phases may be prepared on the external and/or internal surfaces of complex micro- or mesoporous structures such as a zeolite or highly ordered templated material. This can include, but is not limited to mesoporous silicas such as MCM-41 or SBA-15, or metal-organic frameworks or similar coordination polymers.

(ii) Active Materials Encapsulated within a Fluoride-Ion Conductive Coating

Useful structures and compositions include those in which a metal or metal fluoride is encapsulated within a fluoride-ion conductive coating (as described in (i) above) such that there exists sufficient void space within the encapsulation for the volume change between metal and metal fluoride phases (or, between a lower-valent metal fluoride species Mfm and a higher-valent metal fluoride species MFn where n>m for the same metal M) to be accommodated upon conversion without rupture of the coating phase or material. Such structures and compositions are sized to fit within an fluoride-conducting encapsulant, in certain cases with at least enough void space available for up to 100% of the encapsulated metal atoms to be converted to the appropriate metal fluoride phase (e.g. for the process $Fe \rightarrow FeF_3$ at least 211% void space is required compared to the starting volume of Fe, from Table 1). In other cases, the degree of conversion may be controlled electrochemically (e.g. by controlling the voltage limits and/or charge/discharge capacity) so that the encapsulant does not rupture during cycling in the cases whereby there is not enough void space for 100% conversion to be achieved. In addition, structures and compositions are also contemplated where the fluoride-conducting encapsulant is conformal or has a void space insufficient to fully accommodate conversion from the metal to metal fluoride, but has suitable flexibility to stretch or contract without rupture or cracking of the encapsulant. Such compositions may be two-dimensional (e.g. film-void-coating), or three-dimensional (e.g. nanoparticle-void-coating, or a more complex arrangement such as metal-impregnated zeolite-void-coating) as desired.

In still other embodiments, multiple, concentrically arranged encapsulants are contemplated. The respective concentrically arranged encapsulants can be separated by voids, and may be constructed of the same or different materials. In still other embodiments of concentrically arranged encapsulants, the active material and the outermost encapsulant (that contacts the electrolyte) may be separated by a polymer or other flexible material that is able to permit the passage of fluoride ions and is dimensionally able accommodate the volume changes upon cycling with rupturing the outermost encapsulant.

As will be understood, an active material completely surrounded and positioned within an encapsulant, but with at least some remaining void space and/or compressible non-active material (such as a polymer) can be referred to as a "yolk-shell" nanocomposite structure. Such fully encapsulated structures can be based on various compositional arrangements of active material and fluoride-conducting encapsulant. However, other arrangements that include an active material only partially surrounded by a fluoride-conducting protective coating are also contemplated. Such structures may include two or three dimensional non-fluoride conducting support structures (e.g. films, open sided cells, tubes, or the like) containing an active material having one or more sides coated with a fluoride conducting material to allow ion transport. Such support structures can include void space or dimensionally flexible polymer or other material to accommodate the volume changes upon cycling without rupturing the support structure or the encapsulant.

General preparative strategies for "yolk-shell" nanocomposite structures are described in Lou et al., Adv. Mater., 2008, 20, 3987-4019. The metal "yolk" material discussed is commonly Au, which is considered not to be a useful active material for FIB electrochemical cells. Likewise, the "shell" material described is often SiO2, which is considered not to be a useful fluoride ion conducting material. Therefore, suitable preparative strategies for "yolk-shell" nanocomposites useful in FIB electrochemical cells are outlined below. These are intended to be exemplary and are not limiting of the current invention. In certain examples, Cu metal or $CuF_2$ will be used as examples of the active material "yolk" and $LaF_3$ will be used as an example of an encapsulant or "shell" material; as before, these are not limiting of the invention as any material that can accommodate or release fluoride ions upon electrochemical reaction can be envisaged to constitute the "yolk" and any phase or material that permits the exchange of F− between the electrolyte and the active material can be envisaged to constitute the encapsulant or shell. In certain embodiments the active material is less than 1 micron in diameter, and most usefully, the active material "yolk" is between 1 and 500 nm in diameter and the encapsulant is from 2 to 100 nm thick.

Figure 1B:
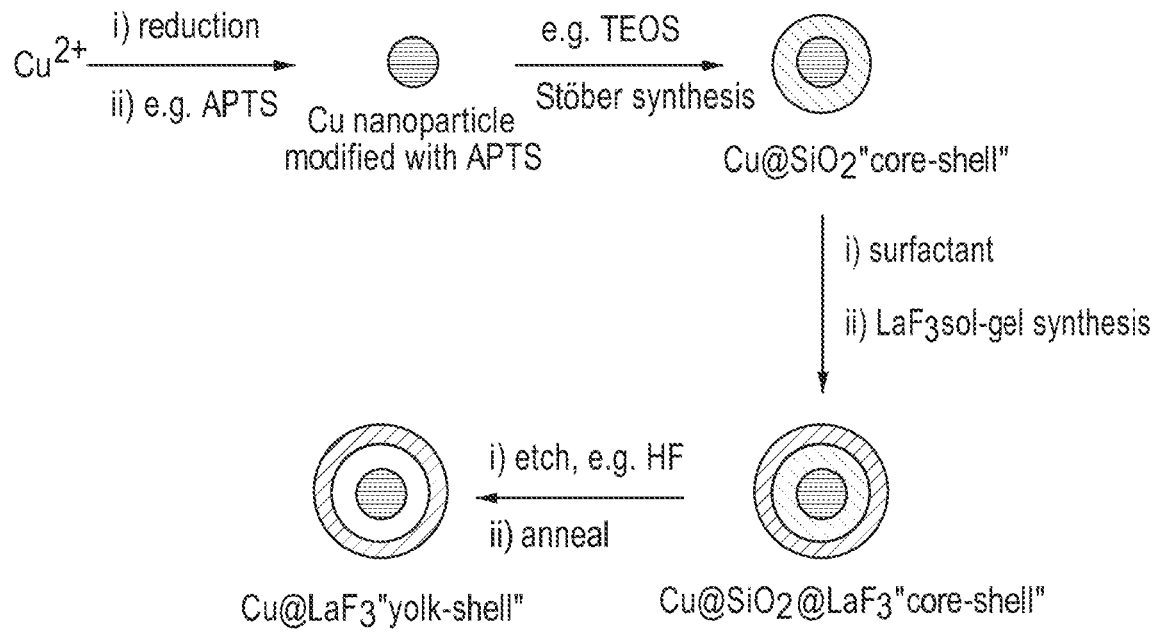
FIG. 1B outlines a general route to "yolk-shell" composites using a sacrificial inorganic "middle" layer.

FIG. 1B outlines a general route using a sacrificial inorganic "middle" layer such as $SiO_2$. For example, Cu nanoparticles can be prepared by reduction of a solution of Cu' ions using hydrazine or similar reducing agent in the presence of stabilizing and/or coordinating species such as sodium citrate and/or surfactant (e.g. cetyltrimethylammonium bromide). Exposure of Cu nanoparticles to a surface-modifying ligand such as aminopropyltrimethoxysilane, APTS, (or other suitable bifunctional species such that one part of the molecule coordinates to the Cu surface, and the other part is presents a reactive silicon moiety to the external environment) followed by addition of hydrolyzable silica source such as tetraethylorthosilicate (TEOS) or sodium silicate solution (water glass) under appropriate conditions (e.g. Stöber synthesis or sol-gel reaction) results in conformal coating of the Cu nanoparticles with $SiO_2$. The thickness of the $SiO_2$ layer (and, hence, the resulting void space) can be controlled by modification of the amount of $SiO_2$ precursor used and the reaction conditions. The $SiO_2$-coated Cu nanoparticles are then coated with an outer layer of $LaF_3$ by sol-gel reaction (optionally in the presence of surfactant such as Lutensol AO), whereby the thickness of this coating can be modified by the amount of $LaF_3$ precursors used and the reaction conditions. This step can be done after separation and/or purification of the intermediate Cu@$SiO_2$ material, or can be performed in the same reaction mixture after formation of the $SiO_2$ layer. The resulting Cu@$SiO_2$@$LaF_3$ composite may, optionally, undergo an annealing step, and/or the $SiO_2$ layer is then removed by exposure of the composite to a $SiO_2$ etchant material such as NaOH or HF under appropriate conditions to afford the Cu@$LaF_3$ "yolk-shell" composition. This material may subsequently undergo a final annealing step, optionally in the presence of a reducing agent such as $H_2$ to purify the Cu surface.

Figure 1C:
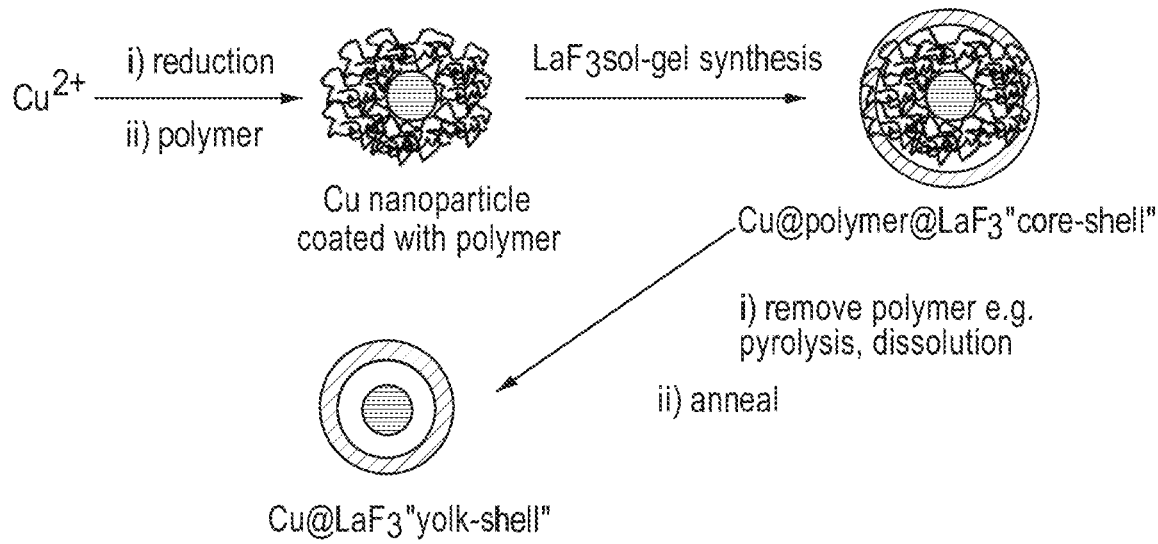
FIG. 1C describes a route to "yolk-shell" composites using a sacrificial polymer "middle" layer.

FIG. 1C describes a similar route using a sacrificial polymer "middle" layer. For example, Cu nanoparticles are coordinated by a polymer shell, by formation of Cu nanoparticles in the presence of a polymer or copolymer that features amino-, hydroxyl-, carboxylate or other ionizable functional groups (such as poly(acrylic acid), poly(ethyleneimine), poly(vinyl alcohol), poly(styrene sulfonate), a protein, a polysaccharide, or gelatin), or by growth of a polymer from the surface of suitably-modified Cu nanoparticles (e.g. poly(styrene sulfonate) grown by atom transfer radical polymerization from a 11-aminoundecyl 2-bromoisobutyrate functionalized surface). The thickness of the polymer layer (and, hence, the resulting void space) can be controlled by the polymer concentration and/or molecular weight. A shell of $LaF_3$ is grown around the outside of this Cu@polymer nanocomposite by sol-gel reaction to afford a Cu@polymer@$LaF_3$ nanocomposite. The polymer layer is then removed by decomposition at elevated temperature (in air or under inert gas such as Ar) or dissolution in suitable solvent (e.g. toluene, dichloromethane or acetone) to give the desired Cu@$LaF_3$ "yolk-shell" composition. This material may subsequently undergo a final annealing step, optionally in the presence of a reducing agent such as $H_2$ to purify the Cu surface. Alternatively, a polymer core-shell architecture such as the hollow latex-type particles described in McDonald and Devon, Adv. Colloid. Interf. Sci., 2002, 99, 181-213 may be employed as a template in which Cu nanoparticles are entrapped (either by exposure of Cu nanoparticles to pre-formed hollow latex particles or by coordination of Cu ions in solution to the ionizable pre-polymer or copolymer, followed by reduction of the Cu ions to give Cu nanoparticles and then generation of the hollow structure through e.g. solvent removal), followed by growth of $LaF_3$ shell, removal of polymer and annealing, as necessary, to generate a Cu@$LaF_3$ "yolk-shell" composition.

Figure 1D:
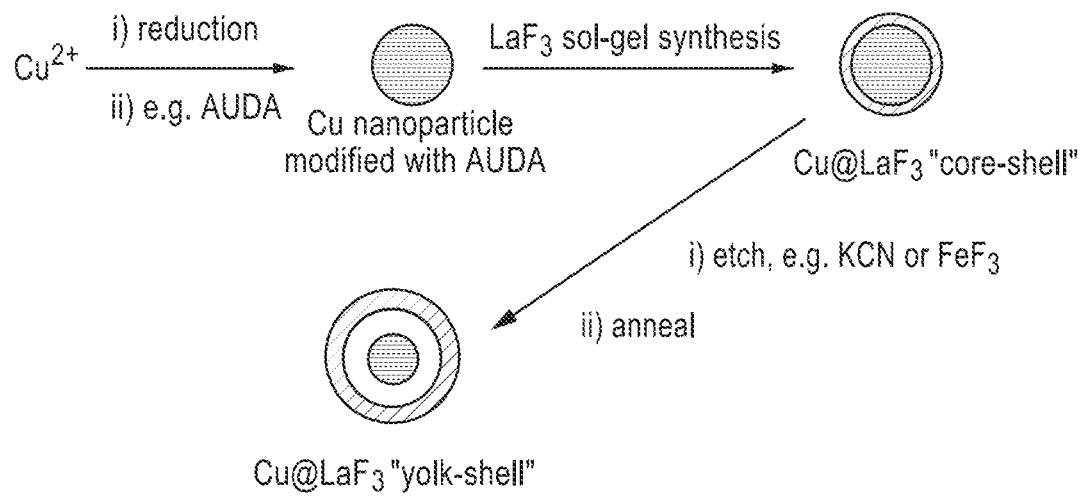
FIG. 1D delineates an alternative route a route to "yolk-shell" composites in the absence of a sacrificial "middle" layer.

FIG. 1D delineates an alternative route in the absence of a sacrificial "middle" layer. For example, Cu nanoparticles are treated with a suitable surface-modifying ligand (e.g. 11-aminoundecanoic acid, AUDA) before an outer layer of $LaF_3$ is grown by sol-gel reaction to give a Cu@$LaF_3$ "core-shell" composite, which may then, optionally, subsequently undergo an annealing step. Partial etching of the Cu "core" using an appropriate etchant (for example, KCN, HCl/$H_2O_2$ or $FeCl_3$; suitable etchants for a wide variety of metals and compounds are given in "The CRC Handbook of Metal Etchants" (CRC, 1990, P. Walker and W. H. Tarn eds.), and may be chosen so as to not affect the "shell" material) enabled through control over the reaction conditions (e.g. etchant concentration, temperature, reaction time) generates void space in the Cu@$LaF_3$ particle, affording a "yolk-shell" Cu@$LaF_3$ composition. This material may subsequently undergo a final annealing step, optionally in the presence of a reducing agent such as $H_2$ to purify the Cu surface.

Figure 1E:
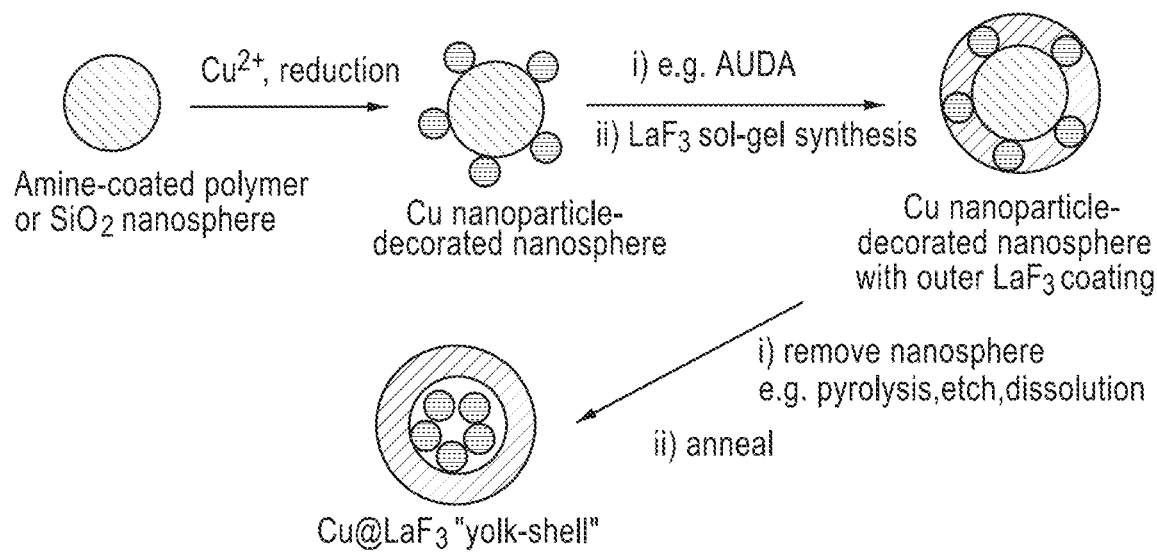
FIG. 1E depicts a variation on "sacrificial" syntheses of "yolk-shell" composites, whereby nanoparticles of the active material are grown on the surface of a "sacrificial" material FIG. 1F outlines the growth of active material in the internal structure or pores of a pre-formed "sacrificial" material FIG. 1G outlines the growth of active material in the internal structure or pores of a pre-formed "sacrificial" material where the shell constituents are chosen to be electrochemically-inactive at the electrochemical reaction potentials of interest.

FIG. 1E depicts a variation on the "sacrificial" syntheses described above, whereby nanoparticles of the active material are grown on the surface of a "sacrificial" material (here, it is the innermost material that is removed). For example, one or more Cu nanoparticles are grown on the surface of amino-functionalized poly(styrene) or $SiO_2$ particles. The resulting composite material is treated with a suitable Cu surface-modifying ligand (e.g. AUDA), after which an outer layer of $LaF_3$ is grown by sol-gel reaction. The innermost material is removed by thermal decomposition, etching or dissolution, resulting in a "yolk-shell" Cu@LaF$_3$ composition featuring one or more Cu nanoparticles. This material may subsequently undergo a final annealing step, optionally in the presence of a reducing agent such as H$_2$ to purify the Cu surface(s) and, optionally, to aggregate the Cu nanoparticles.

Figure 1F:
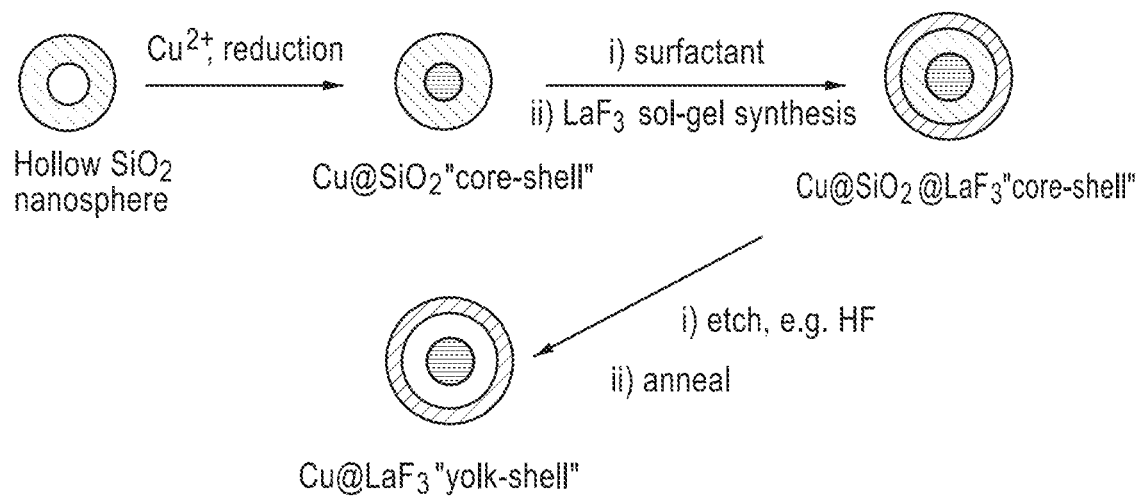

FIG. 1F outlines an alternative strategy, in which active material is grown in the internal structure or pores of a pre-formed "sacrificial" material. For example, Cu nanoparticles may be grown inside hollow SiO$_2$ nanospheres (see e.g. Hah et al., Chem. Commun., 2004, 1012-1013 for a possible synthetic approach). These Cu@SiO$_2$ "core-shell" nanocomposites are then coated with an outer layer of LaF$_3$ by sol-gel reaction (optionally in the presence of surfactant such as Lutensol AO), whereby the thickness of this coating can be modified by the amount of LaF$_3$ precursors used and the reaction conditions. The resulting Cu@SiO$_2$@LaF$_3$ composite may, optionally, undergo an annealing step, and/or the SiO$_2$ layer is then removed by exposure of the composite to a SiO$_2$ etchant material such as NaOH or HF under appropriate conditions to afford the Cu@LaF$_3$ "yolk-shell" composition. This material may subsequently undergo a final annealing step, optionally in the presence of a reducing agent such as H$_2$ to purify the Cu surface. In related syntheses, micro- or mesoporous materials such as zeolites may be used as the "template" for Cu nanoparticle formation, followed by subsequent Cu@LaF$_3$ "yolk-shell" generation in analogous fashion.

Figure 1G:
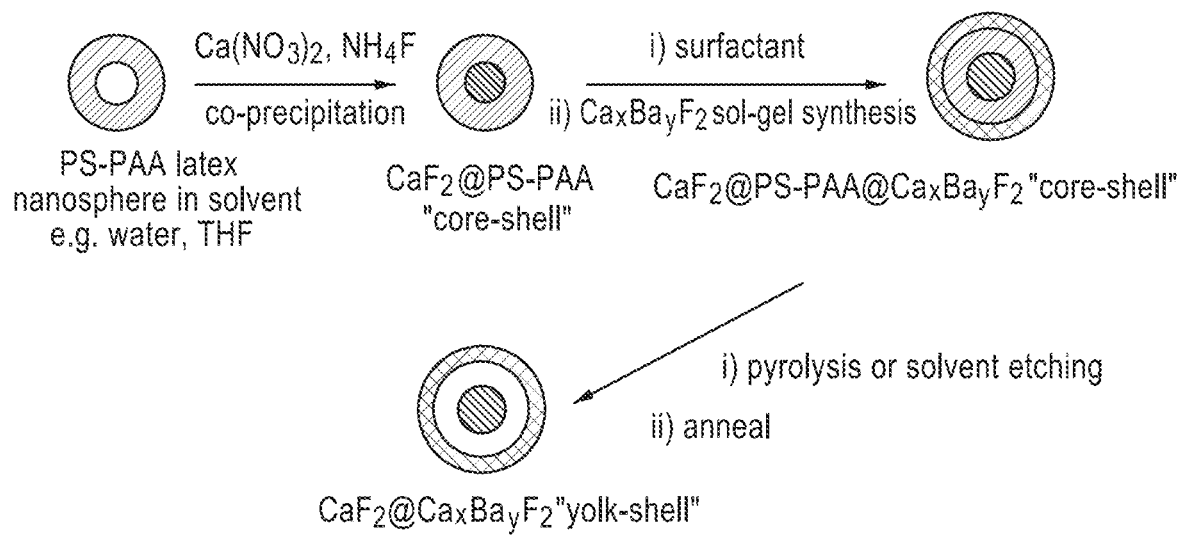

FIG. 1G also depicts an analogous alternative strategy whereby a highly-electropositive metal or its metal fluoride, such as CaF$_2$, is grown within the interior space of a hollow material such as a poly(styrene)-poly(acrylic acid) latex copolymer in a suitable solvent. These polymer-encapsulated CaF$_2$ nanocrystals are then coated with an outer layer of fluoride-ion conducting material of suitable electrochemical stability so as not to be itself reduced at the conversion potential of CaF$_2$ to Ca (~0.2 V vs. Li+/Li). Examples of suitable protective materials include solid solutions such as Ca$_x$Ba$_y$F$_2$ (x+y=1) where the Ca' and Ba$^{2+}$ ions in the protective shell are not substantially reduced during the conversion reaction of CaF$_2$ particles within the shell; in contrast a shell featuring a less electropositive metallic element (e.g. LaF$_3$) would itself be reduced in preference to the inner CaF$_2$ particles. The resulting CaF$_2$@polymer@Ca$_x$Ba$_y$F$_2$ composite may, optionally, undergo an annealing step, and/or the polymer layer is then removed by exposure of the composite to high temperature or a suitable solvent etchant material that removes the polymer to the CaF$_2$@Ca$_x$Ba$_y$F$_2$ "yolk-shell" composition.

Using the described encapsulated active material and/or yolk-shell nanocomposite electrodes, along with electrolytes, binders, additives, separators, battery casing or packaging, current collectors, electrical contacts, electronic charge and discharge controllers, and other elements of battery construction known to those skilled in the art, one can create useful lithium-free electrochemical cells operable at temperatures ranging from −40 degrees to 200 degrees Celsius. Such electrochemical cells can have substantially irreversible electrochemical reactions during discharge, making them suitable for forming galvanic cells or primary batteries. Alternatively, certain structures and compositions having an electrochemical reaction is at least partially reversible through application of electrical charge, secondary (rechargeable) batteries can be formed.

In certain embodiments, electrolytes suitable for FIB battery systems can include a fluoride salt and a solvent in which the fluoride salt is at least partially present in a dissolved state. The fluoride salt can be a metal fluoride or a non-metal fluoride. The solvent can be an organic liquid or an ionic liquid, or a mixture of the two. In other embodiments, electrolytes suitable for FIB battery systems can include a composite electrolyte containing fluoride salt, a polymer and optionally an organic liquid, an ionic liquid, or a mixture of the two. Electrolytes can include, but are not limited to combinations of fluoride salts and solvents disclosed in U.S. Pat. No. 9,166,249, titled "Fluoride Ion Battery Compositions", the disclosure of which is herein incorporated by reference.

For example, liquid electrolyte salts suitable for FIB systems may contain complex cations in combination with the fluoride anion. The cation may feature organic groups, such as alkylammmonium, alkylphosphonium or alkylsulfonium species, or may consist of metal-organic or metal-coordination complex motifs, such as metallocenium species. Useful solvents for such liquid electrolyte salts may include non-aqueous solvents (denoted here as "organic") that are capable of dissolving the aforementioned fluoride salts to molar concentrations of 0.01 M and above, preferred concentrations being between 0.1 and 3 M. Examples of such solvents include acetone, acetonitrile, benzonitrile, 4-fluorobenzonitrile, pentafluorobenzonitrile, triethylamine (TEA), diisopropylethylamine, 1,2-dimethoxyethane, ethylene carbonate, propylene carbonate (PC), γ-butyrolactone, dimethyl carbonate, diethyl carbonate (DEC), methyl ethyl carbonate, propyl methyl carbonate, tetrahydrofuran, 2-methyltetrahydrofuran, nitromethane, benzene, toluene, chloroform, dichloromethane, 1,2-dichloroethane, dimethylsulfoxide, sulfolane, N,N-dimethylformamide (DMF), N,N-dimethylacetamide (DMA), carbon disulfide, ethyl acetate, methyl butyrate, n-propyl acetate, methyl propionate, methyl formate, 4-methyl-1,3,-dioxolane, pyridine, methyl isobutyl ketone, methyl ethyl ketone, hexamethylphosphoramide, hexamethylphosphorus triamide, 1 methyl-2-pyrrolidinone, 2-methoxyethyl acetate, trimethyl borate, triethylborate and substituted derivatives thereof, as well as sulfones such as ethylmethylsulfone, trimethylene sulfone, 1-methyltrimethylene sulfone, ethyl-sec-butyl sulfone, ethyl isopropyl sulfone (EIPS), 3,3,3-trifluoropropylmethyl sulfone, 2,2,2-trifluoroethyl sulfone, bis(2,2,2-trifluoroethyl)ether (BTFE), glymes (e.g., diglyme, tetraglyme), 1,2-dimethoxyethane (DME) and mixtures thereof. In certain embodiments, room temperature ionic liquid materials, or ionic liquids that remain liquid at temperatures below 200 degrees Celsius (such as those described in "Electrochemical Aspects of Ionic Liquids", E. Ohno ed., Wiley Interscience, New York, 2005), are preferred. These can include ionic liquids that remain liquid at temperatures below 100 degrees Celsius such as 1-methyl, 1-propylpiperidinium bis(trifluoromethanesulfonyl)imide (MPPTFSI), butyltrimethylammonium bis(trifluoromethanesulfonyl)imide (BTMATFSI) and 1-butyl,1-methylpyrrolidinium bis(trifluoromethanesulfonyl)imide (BMPTFSI) and their fluoroalkylphosphate (FAP) anion derivatives (e.g. MPPFAP) where FAP is a hydrophobic anion such as tris(pentafluroethyl)trifluorophosphate, all of which alone or in combination are useful solvents.

In certain other embodiments, the electrolytes suitable for FIB battery systems can include the compositions disclosed above with the addition of a fluoride-ion complexing species such as an anion receptor, a cation complexing species such as a crown ether, or a combination of both. Suitable anion receptors include species capable of binding fluoride anion such as boron, aluminum, ammonium, H-bond donor or similar groups, including aza ethers and alkyl and aryl boron and boronate complexes such as those described in McBreen et al, J. Power Sources, 2000, 89, 163 and West et al., J. Electrochem. Soc., 154, A929 (2007), and boroxin species such as those described in Nair et al., J. Phys. Chem. A, 113, 5918 (2009), all of which are incorporated by reference herein. In particular tris(hexafluoroisopropyl)borate, tris (pentafluorophenyl)borane and all possible regioisomers of difluorophenyl boroxin (DFB), trifluorophenyl boroxin, bis (trifluoromethyl)phenyl boroxin, trifluoromethyl)phenyl boroxin and fluoro(trifluoromethyl)phenyl boroxin can be used.

As will be appreciated, fluoride ion batteries are suitable for a wide range of primary or rechargeable applications, including but not limited to vehicle traction batteries (electric vehicles (EV), hybrid vehicles (HEV), and plug-in hybrid (PHEV)) or vehicle starter or ignition batteries. FIB systems can be useful stationary batteries for emergency power, local energy storage, starter or ignition, remote relay stations, communication base stations, uninterruptible power supplies (UPS), spinning reserve, peak shaving, or load leveling, or other electric grid electric storage or optimization applications. Small format or miniature battery applications including watch batteries, implanted medical device batteries, or sensing and monitoring system batteries (including gas or electric metering) are contemplated, as are other portable applications such as flashlights, toys, power tools, portable radio and television, mobile phones, camcorders, lap-top, tablet or hand-held computers, portable instruments, cordless devices, wireless peripherals, or emergency beacons. Military or extreme environment applications, including use in satellites, munitions, robots, unmanned aerial vehicles, or for military emergency power or communications are also possible.

III (c) Comparative Example 1 and Experimental Example 1

Figure 3:
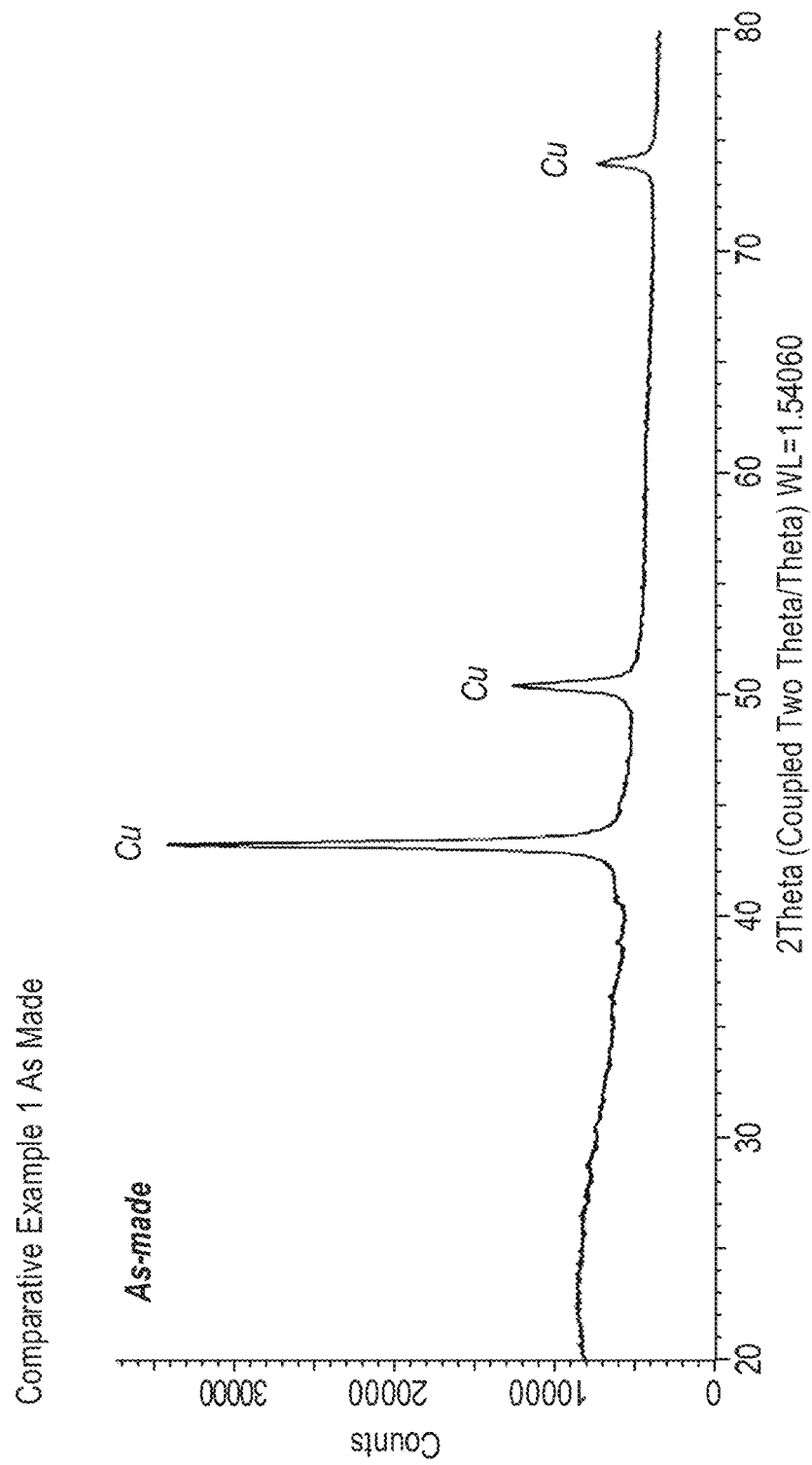
FIG. 3 shows an XRD spectrum of isolated copper nanoparticles of Comparative Example 1, with no shell, immediately after synthesis and isolation ("as-made").
Figure 4:
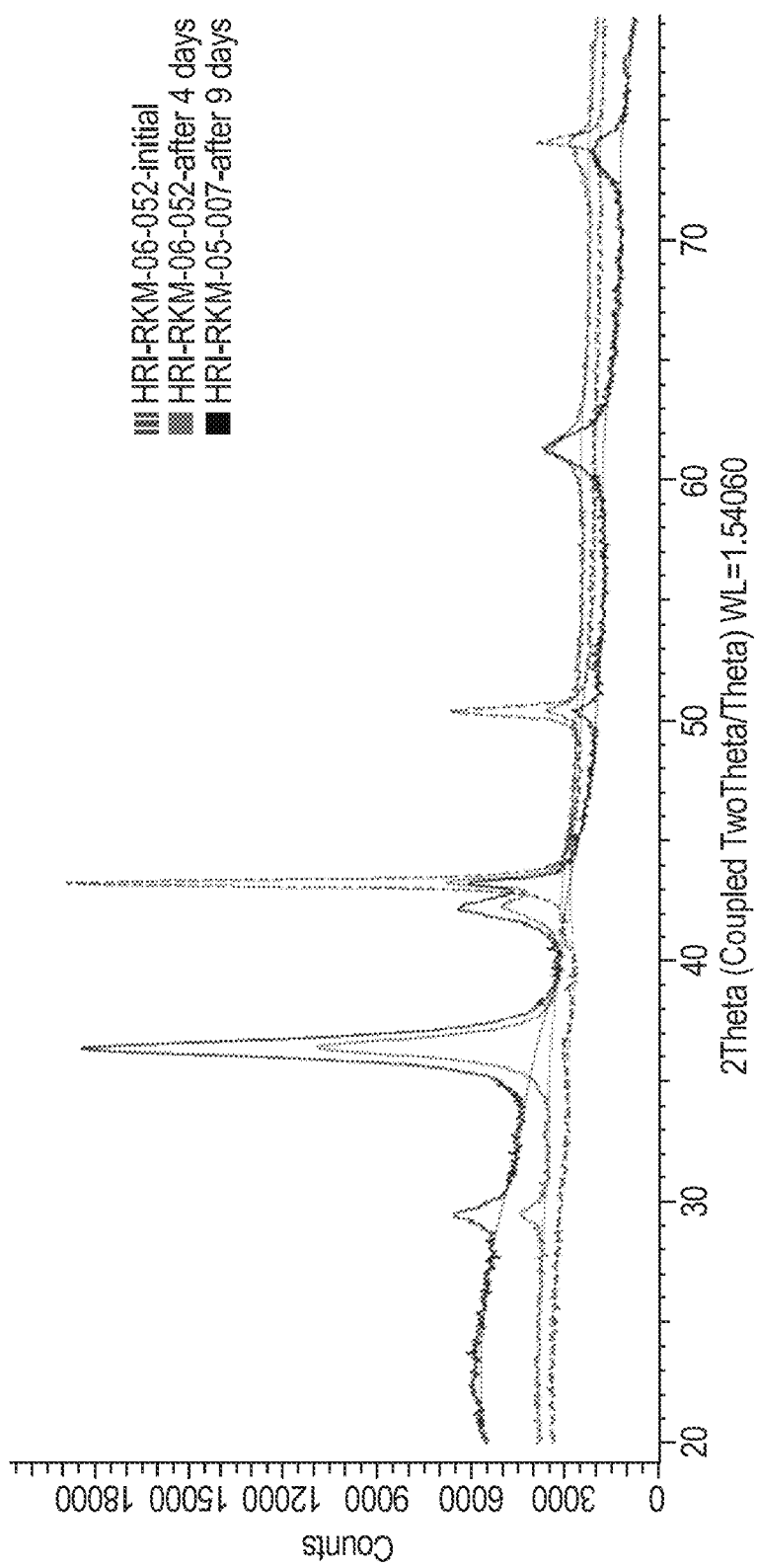
FIG. 4 shows stacked XRD spectra of isolated copper nanoparticles of Comparative Example 1, with no shell, as-made and after exposure to air for 4 days and 9 days.

In a Comparative Example 1, copper nanoparticles were made without a shell and analyzed. First, 2 mmol of $Cu(NO_3)_2.2.5H_2O$ and 1.87 mmol CTAB were dissolved in 75 ml water at room temperature, and 0.5 ml $NH_4OH$ (28-30 wt % $NH_3$ in water, 14.8M) were added to adjust the pH to about 10-11. A solution was prepared containing hydrazine (3 ml of 50-60% reagent grade), CTAB (1.87 mmol), and citric acid (0.38 mmol) in water (75 ml) under argon and mixed for about 20 minutes before adding the copper nitrate solution. The reaction mixture was stirred for 1.5 hrs, to maximize copper nanoparticle growth. The resulting copper nanoparticles (~50 nm) were isolated and washed. Specifically, the reaction synthesis mixture was centrifuged, decanted, mixed with ethanol and sonicated. FIG. 3 shows an X-ray diffraction (XRD) spectrum of the copper nanoparticles as-made. Three peaks are visible, all corresponding to Cu (° 2θ): 43.0, 50.5, and 74.0. However, upon exposure to air, Cu is oxidized to $Cu_2O$, which begins forming at least as early as 4 days and is the main product after 9 days. This is illustrated in FIG. 4, which shows appearance of new peaks at 29.5, 42.3, 61.3, and 73.5° 2θ, corresponding to $Cu_2O$.

In Experimental Example 1, core-shell nanoparticles were made in accordance with the present disclosure that comprised a core comprising a copper nanoparticle coated with a shell comprising lanthanum fluoride ($Cu/LaF_3$). The ~50 nm copper nanoparticles were made using the same method as Comparative Example 1, but were redispersed in water with 3 ml of hydrazine (3 ml of 50-60% reagent grade) under an argon atmosphere following isolation and washing of the copper nanoparticles. To the mixture of water, copper nanoparticles, and hydrazine was added a solution of $La(NO_3)_3.6H_2O$ (1 mmol in 15 ml $H_2O$) and a solution of NaF (1 mmol in 15 ml $H_2O$). The reaction mixture was stirred for 10 minutes and then centrifuged.

Figure 5:
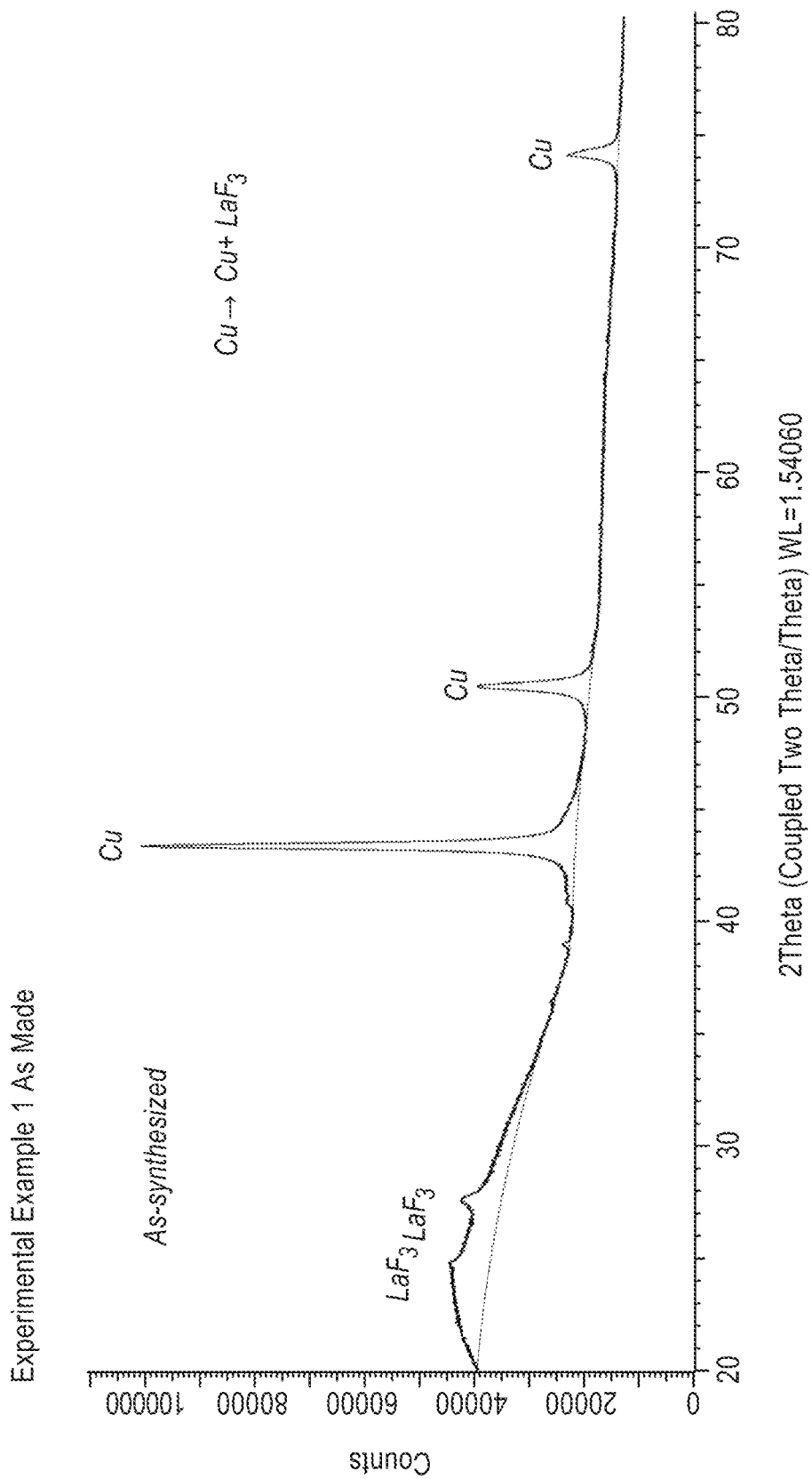
FIG. 5 shows an XRD spectrum of Cu—$LaF_3$ core-shell nanoparticles of Experimental Example 1 as synthesized in an aspect of the present disclosure.
Figure 6:
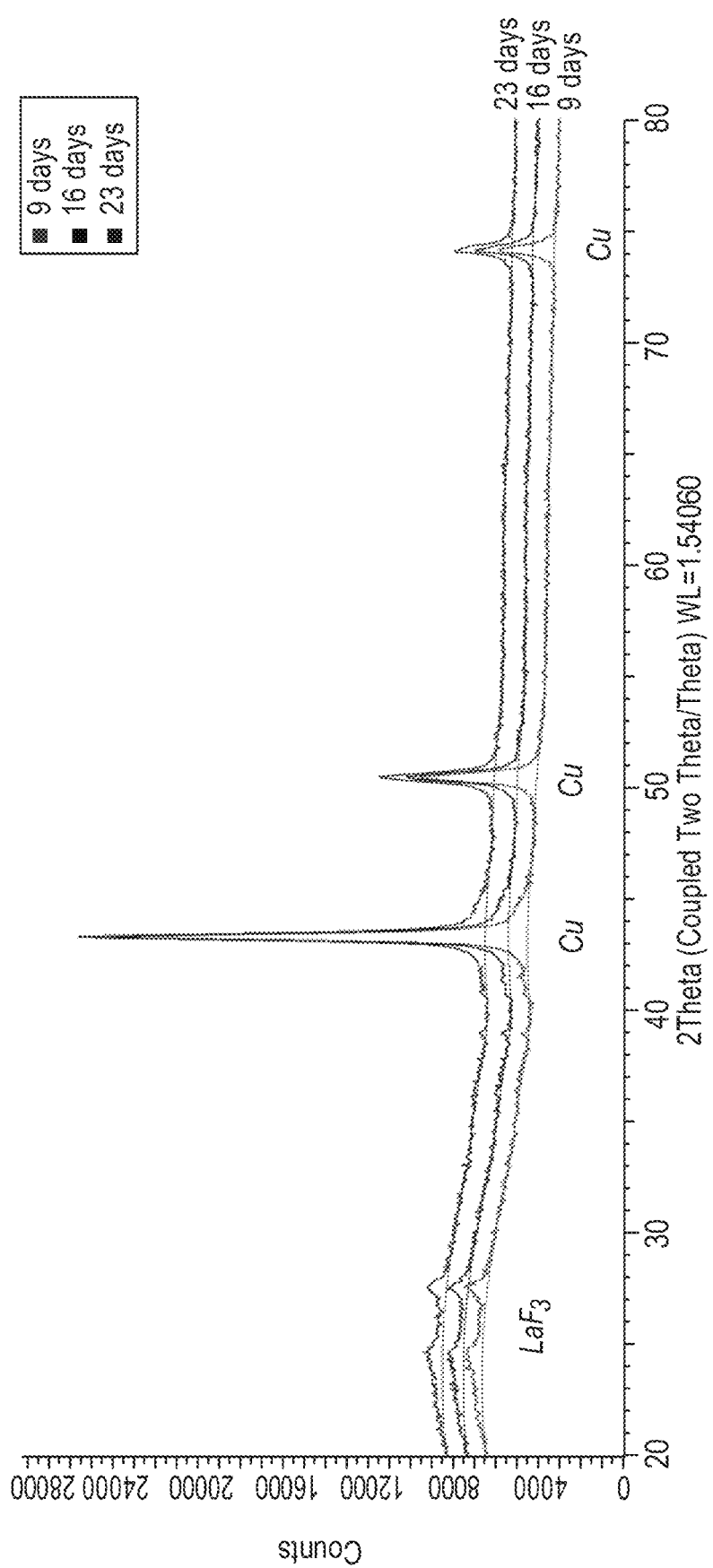
FIG. 6 shows stacked XRD spectra of Cu—$LaF_3$ core-shell nanoparticles of Experimental Example 1 after exposure to air for 9, 16, and 23 days.
Figure 8A:
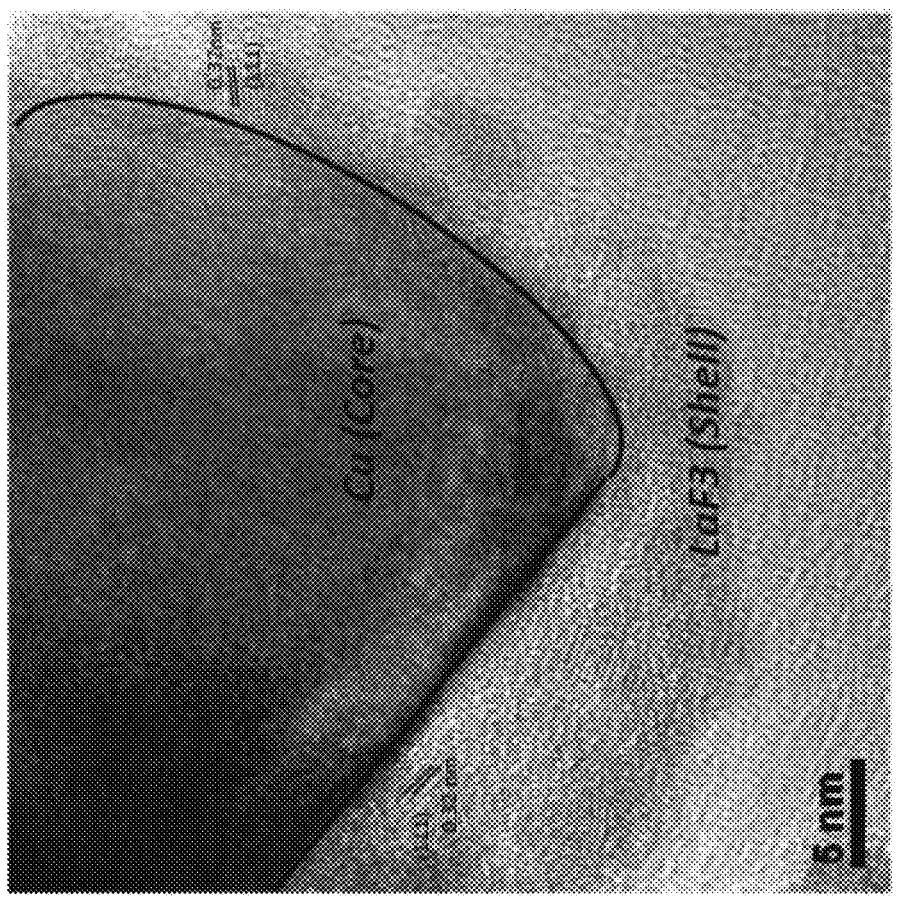
FIG. 8A shows a high-resolution TEM image of Cu—$LaF_3$ core-shell nanoparticles of Experimental Example 1, indicating the Cu (core) and $LaF_3$ (shell) areas.
Figure 8C:
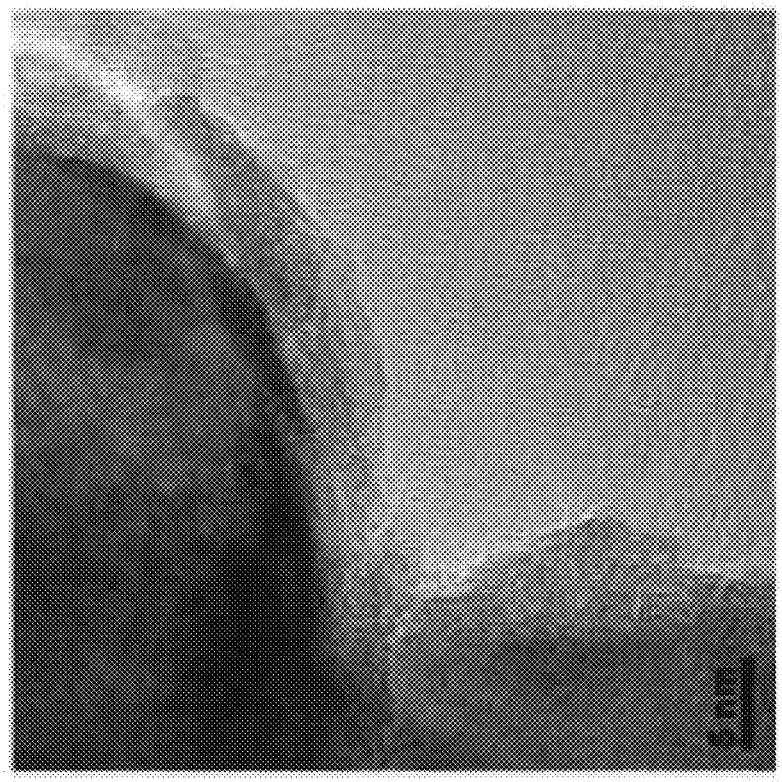
FIGS. 8B and 8C show zoomed-out images of the same nanoparticles.
Figure 8B:
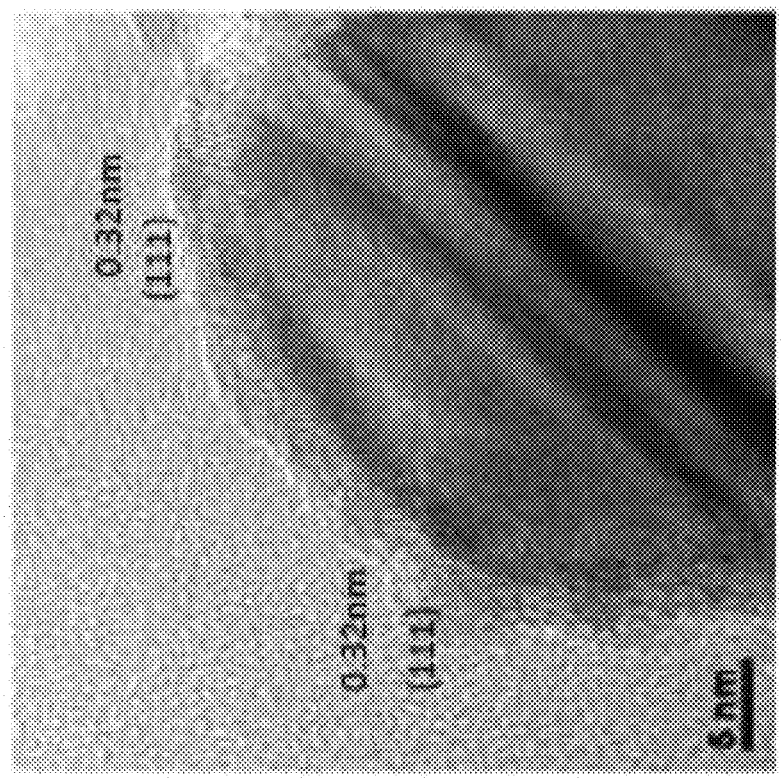

The precipitate was isolated by centrifuge and analyzed by XRD. The XRD spectrum of the core-shell nanoparticles as synthesized is shown in FIG. 5. The XRD spectrum shows 5 peaks (° 2θ): 25.0 ($LaF_3$), 28.0 ($LaF_3$), 43.5 (Cu), 50.4 (Cu), 74.0 (Cu). FIG. 6 shows stacked XRD spectra of the core-shell nanoparticles upon exposure to air for 9, 16, and 23 days. In contrast to Comparative Example 1, no spectral changes were observed. FIGS. 7A and 7B show TEM images of the core-shell nanoparticles as synthesized. As shown, the copper nanoparticle cores are covered with the $LaF_3$ shell. The shell has a thickness of about 0.30 nanometers. FIGS. 8A-8C show high-resolution TEM images of the core-shell nanoparticles as synthesized. The central black areas correspond to the copper core, and the peripheral black and white areas correspond to the $LaF_3$ shell. The figures show homogeneous coverage of the copper core directly coated with the $LaF_3$ shell.

Accordingly, the core-shell nanoparticle synthesized in Experimental Example 1 provides a shell capable of protecting the underlying metal core. Such a core-shell nanoparticle is useful for applications where the operating conditions would dissolve, oxidize, or otherwise contaminate the metal core. Illustrative examples include use of the core-shell nanoparticles as battery electrode materials.

Figure 9:
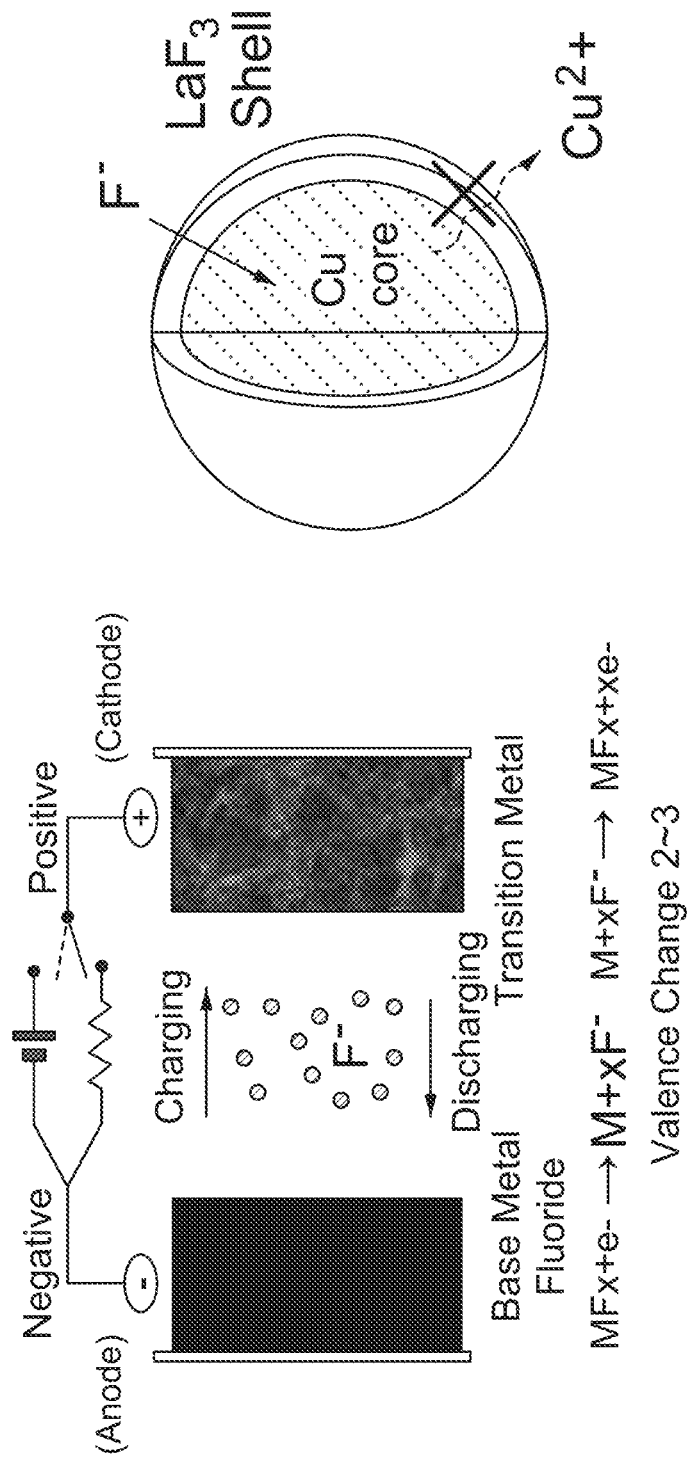
FIG. 9 is a schematic of illustration of a fluoride ion electrochemical cell including the Cu—$LaF_3$ core-shell nanoparticle of Experimental Example 1 as an active material in the negative electrode (anode) in an aspect of the present disclosure.

In a non-limiting example as shown in FIG. 9, the core-shell nanoparticle of Experimental Example 1 may be included as an active material in a negative electrode (anode) of an F-shuttle battery. The $LaF_3$ shell protects the copper core allowing it to operate as an active material without being dissolved. As shown in FIGS. 10A and 10B, the core-shell nanoparticles of Experimental Example 1 were tested as the active material in an anode. The anode included the core-shell nanoparticles, a conductive agent (super P carbon), and PVdF binder in a ratio of 8:1:1.

Comparative Example 2

An attempt was made to make a core-shell nanoparticle including a core comprising a copper nanoparticle directly coated with a shell comprising lanthanum fluoride (Cu/$LaF_3$). Comparative Example 2 was performed identically to Experimental Example 1, except that 1 mmol $LaCl_3.7H_2O$ was used instead of $La(NO_3)_3.6H_2O$.

Figure 11:
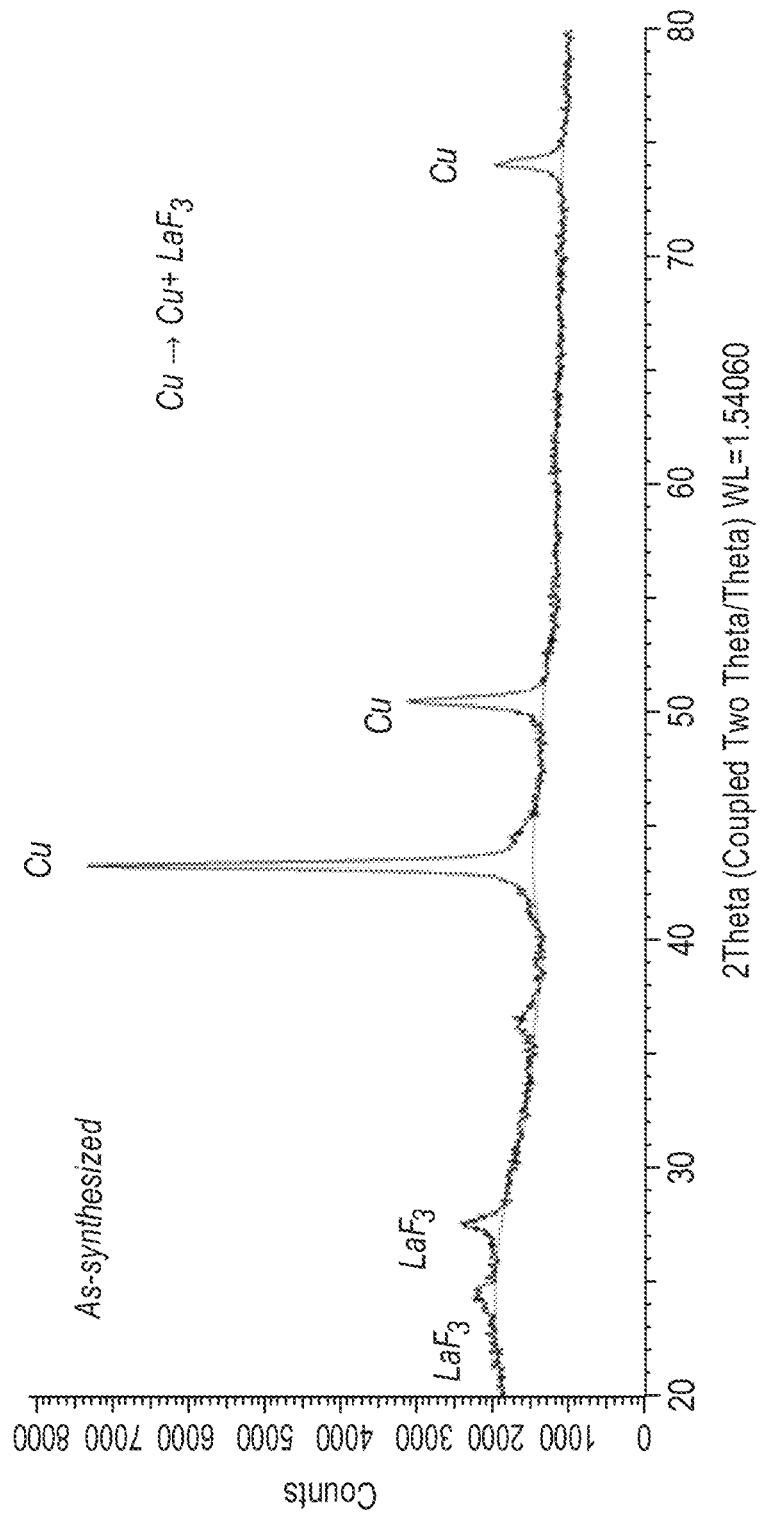
FIG. 11 shows an XRD spectrum of nanoparticles of Comparative Example 2 as synthesized.

The XRD spectrum of the nanoparticles as synthesized in Comparative Example 2 is shown in FIG. 11. The XRD spectrum shows 5 peaks (° 2θ): 24.5 ($LaF_3$), 27.6 ($LaF_3$), 43.6 (Cu), 50.5 (Cu), 74.1 (Cu). Therefore, the Cu remains during the course of the reaction of $LaCl_3$ and NaF.

Figure 12:
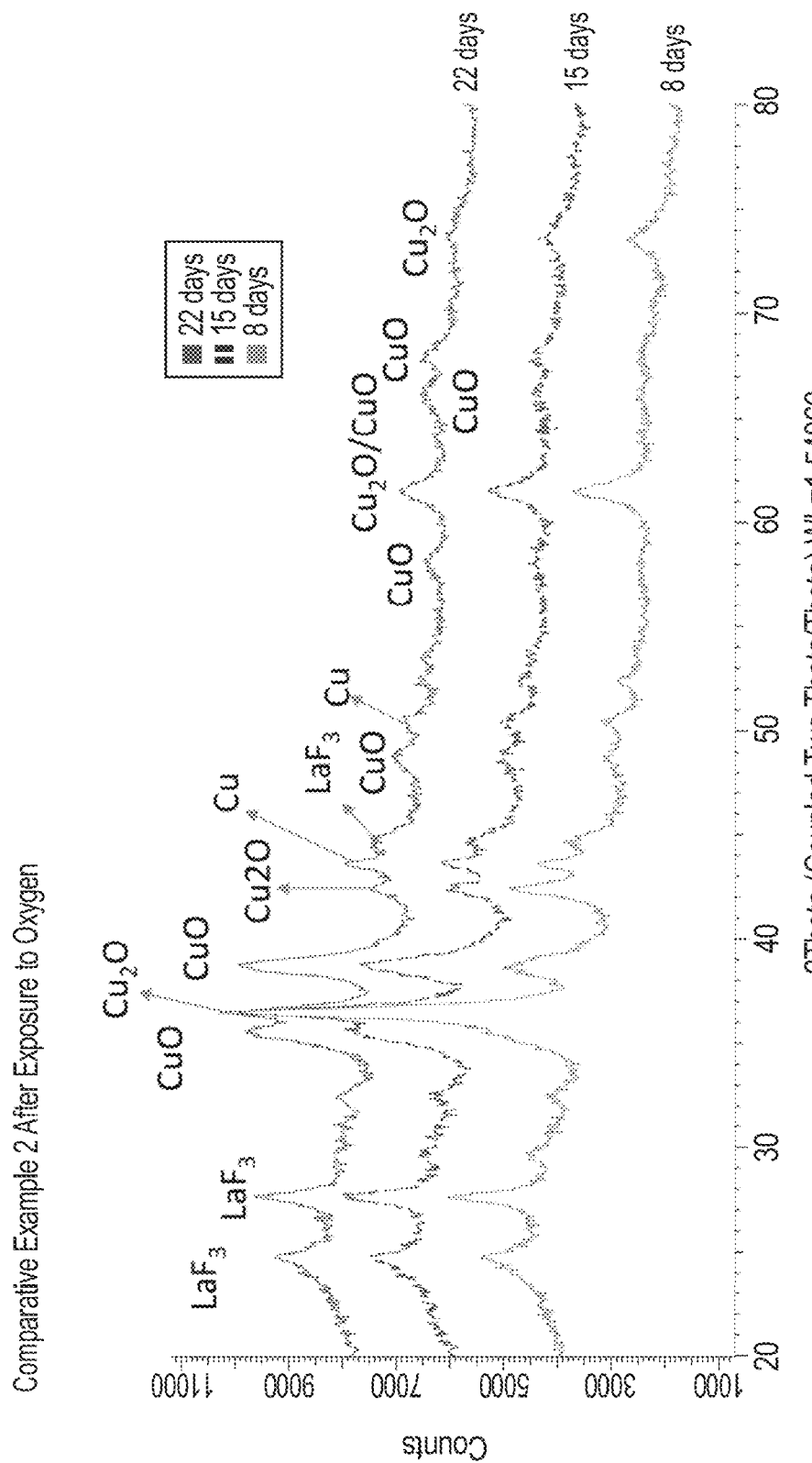
FIG. 12 shows stacked XRD spectra of nanoparticles of Comparative Example 2 after exposure to air for 8, 15, and 22 days.
Figure 13:
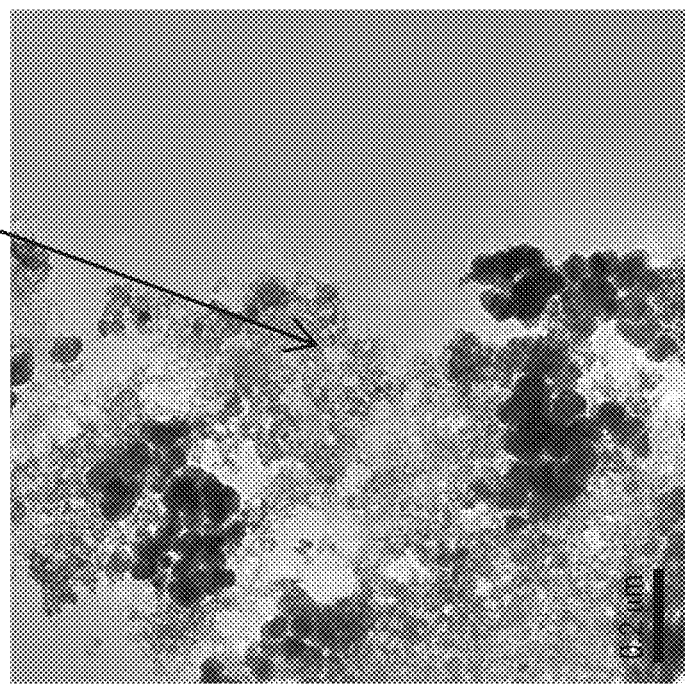
FIG. 13 is a TEM image of the nanoparticles of Comparative Example 2 showing inhomogeneous, partial coverage of copper nanoparticles with $LaF_3$, as well as $LaF_3$ that is not associated with copper nanoparticles.

However, oxidation of the Cu following exposure of the core-shell nanoparticles of Comparative Example 2 indicated that the shell was not properly formed. FIG. 12 shows stacked XRD spectra of the nanoparticles synthesized in Comparative Example 2 upon exposure to air for 8, 15, and 22 days. Additional peaks are observed starting at 8 days (° 2θ): 35.4, 36.4, 38.8, 42.5, 44.8, 48.7, 52.3, 61.5, 73.5. At least the peaks at 36.4, 42.5, 61.5, and 73.5° 2θ are consistent with $Cu_2O$ formation. The peaks at 43.6, 50.5, and 74.1° 2θ, which are consistent with Cu, have also diminished in intensity. As shown in FIG. 13, the TEM image shows inhomogeneous, partial coverage of Cu nanoparticles with $LaF_3$, as well as $LaF_3$ that is not associated with Cu nanoparticles. Accordingly, shells made with $LaCl_3.7H_2O$ do not result in a desirable core-shell composition as it would leave the Cu core exposed to the environment of an electrochemical cell that might dissolve the Cu core. In addition, the $LaF_3$ that is not associated with Cu nanoparticles would decrease the overall efficiency of any system incorporating the mixture.

Layered Thin Film Electrode Study

The core and shell materials may also be studied in a thin film electrode configuration.

Briefly, copper was sputtered to a thickness of about 80 nm onto a glassy carbon substrate of 1 mm thickness. After formation of a Cu film, $LaF_3$ was sputtered onto the Cu layer to a thickness of less than 5 nm, to form a double-layered thin film; for comparison purposes, a single layered Cu thin film without the $LaF_3$ coating was also prepared. The thin films were studied in a three electrode cell configuration, with a Ag-wire soaked in 1-methyl-1-propylpyrrolidinium bis(trifluoromethylsulfonyl)imide (MPPyTFSI) and 0.01 M AgOTf as the reference electrode and a Pt-wire as a counter electrode, and using 0.1M tetramethylammonium fluoride (TMAF) in MPPyTFSI as the electrolyte. Cyclic voltammetry was measured in the range from −2.4V to −0.7V vs. Ag/Ag+. Evaluation was conducted in a moisture- and oxygen-free glove box.

Figure 14:
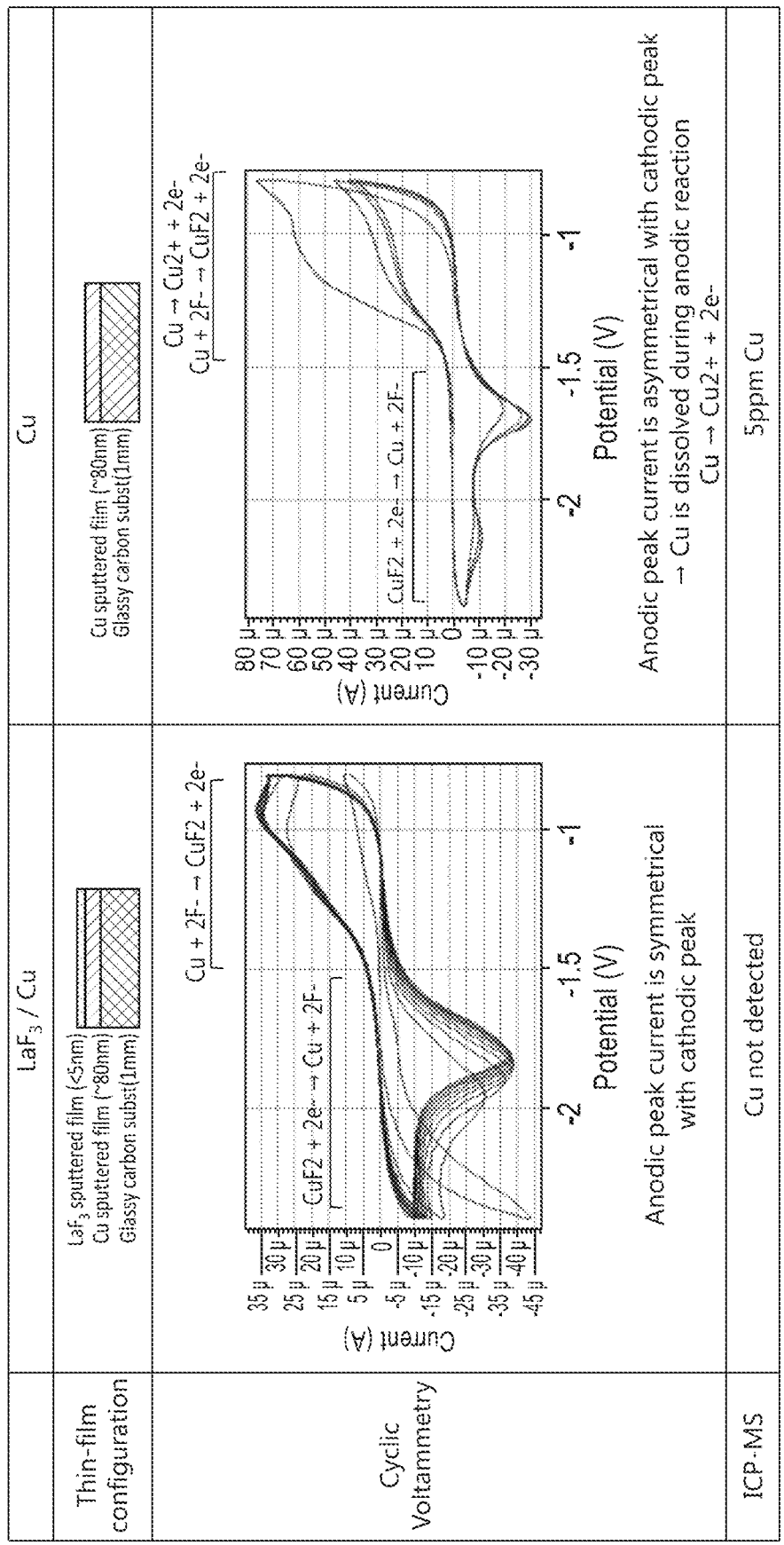
FIG. 14 shows $LaF_3$/Cu and Cu thin-film configurations and cyclic voltammetry data.

The cyclic voltammograms obtained are shown in FIG. 14. For the double layered thin film, the anodic peak measured was symmetrical with the cathodic peak, and no copper ions were detected in the electrolyte by ICP-MS. These results indicate reversible transport of fluoride ions from the $LaF_3$ layer into the Cu later. In comparison, the cyclic voltammogram obtained for the single layered Cu thin film is asymmetric. The anodic current exceeds the cathodic current, indicating dissolution of the Cu during anodic reaction. ICP-MS data confirms this, showing 5 ppm Cu in the electrolyte.

Figure 15A:
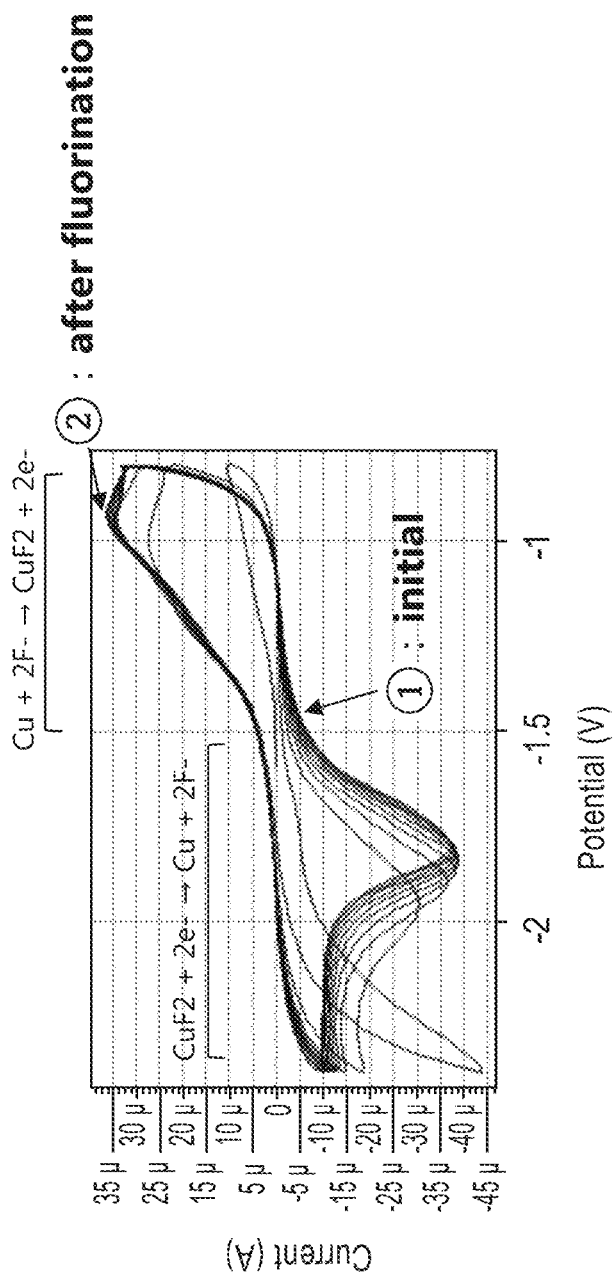
FIG. 15A shows a cyclic voltammogram for a $LaF_3$/Cu double-layered thin film.

The Cu—$LaF_3$ double layered thin film electrode was also studied by XPS, initially and after fluorination at the voltages indicated in FIG. 15A. The initial time point (1 in FIG. 15A) was studied as deposited. The potential was then swept from OCV (about −1.5V vs Ag/Ag+) to −0.8V and maintained for 1 hour. After fluorination reaction, a sample of the electrode was taken for XPS depth profiling analysis.

In the initial XPS spectrum (FIG. 15B) the surface contains more La and F than Cu. After fluorination, fluoride ions can be detected at higher levels at deeper depths than in the initial XPS spectrum; in the initial spectrum, fluoride levels dropped off more sharply with increasing depth. Collectively, the XPS data show that fluoride ions can penetrate into the copper layer. Thus, after reduction, fluoride ions can diffuse into the Cu cores.

Example 3

Figure 16:
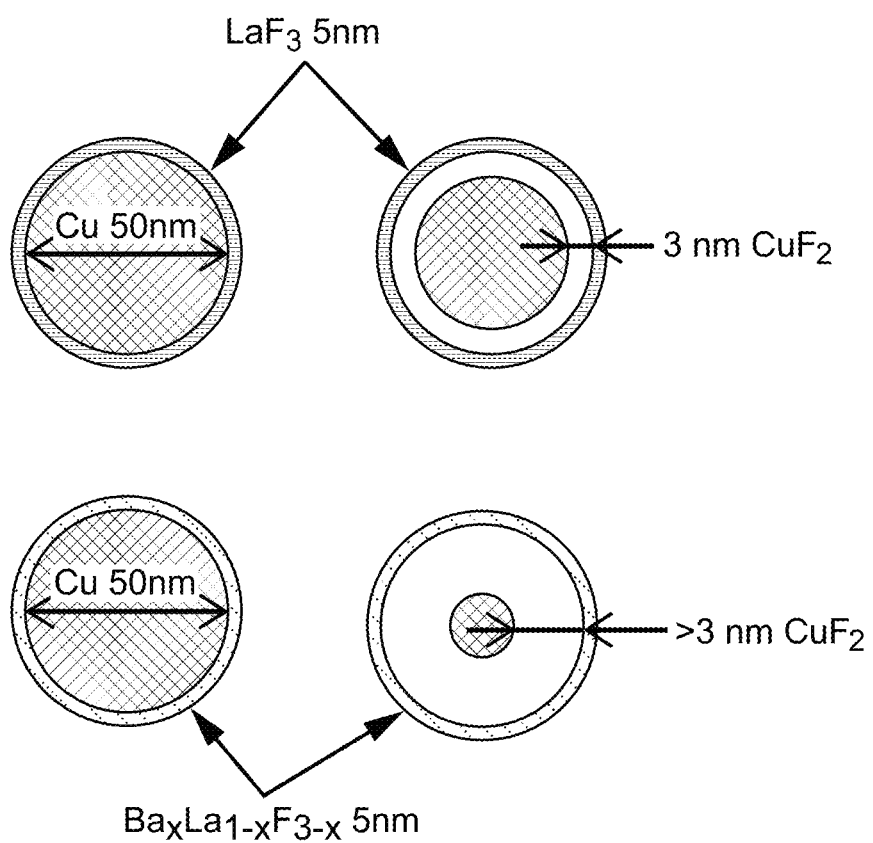
FIG. 16 shows schematic representations of Cu@$LaF_3$ and Cu@$Ba_xLa_{1-x}F_{3-x}$ nanoparticles according to some aspects of the present disclosure.
Figure 17A:
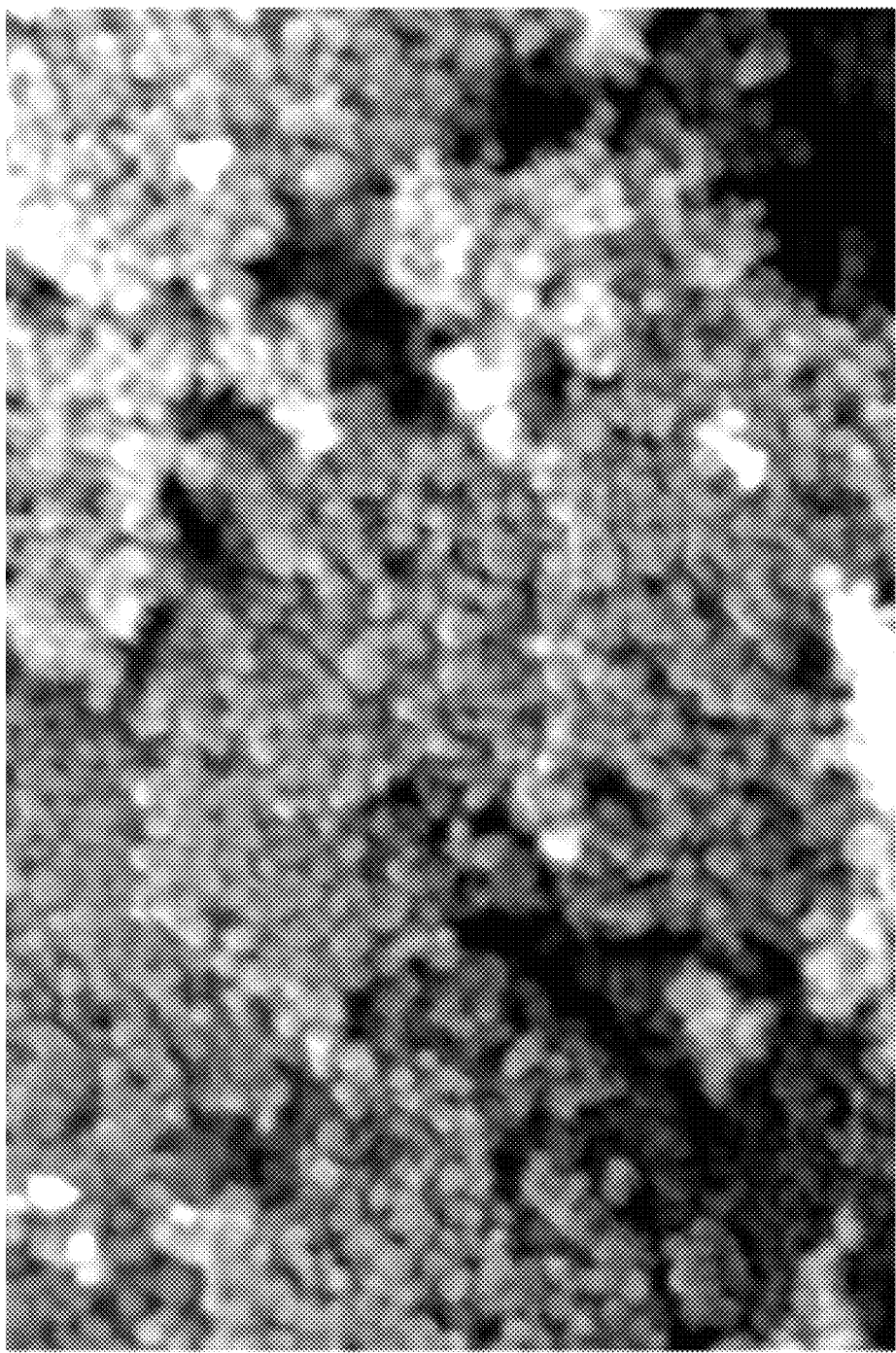
FIG. 17A shows an example of a scanning electron microscopy (SEM) image of Cu@$La_{0.97}Ba_{0.03}F_{2.97}$ according to some aspects of the present disclosure.
Figure 17B:
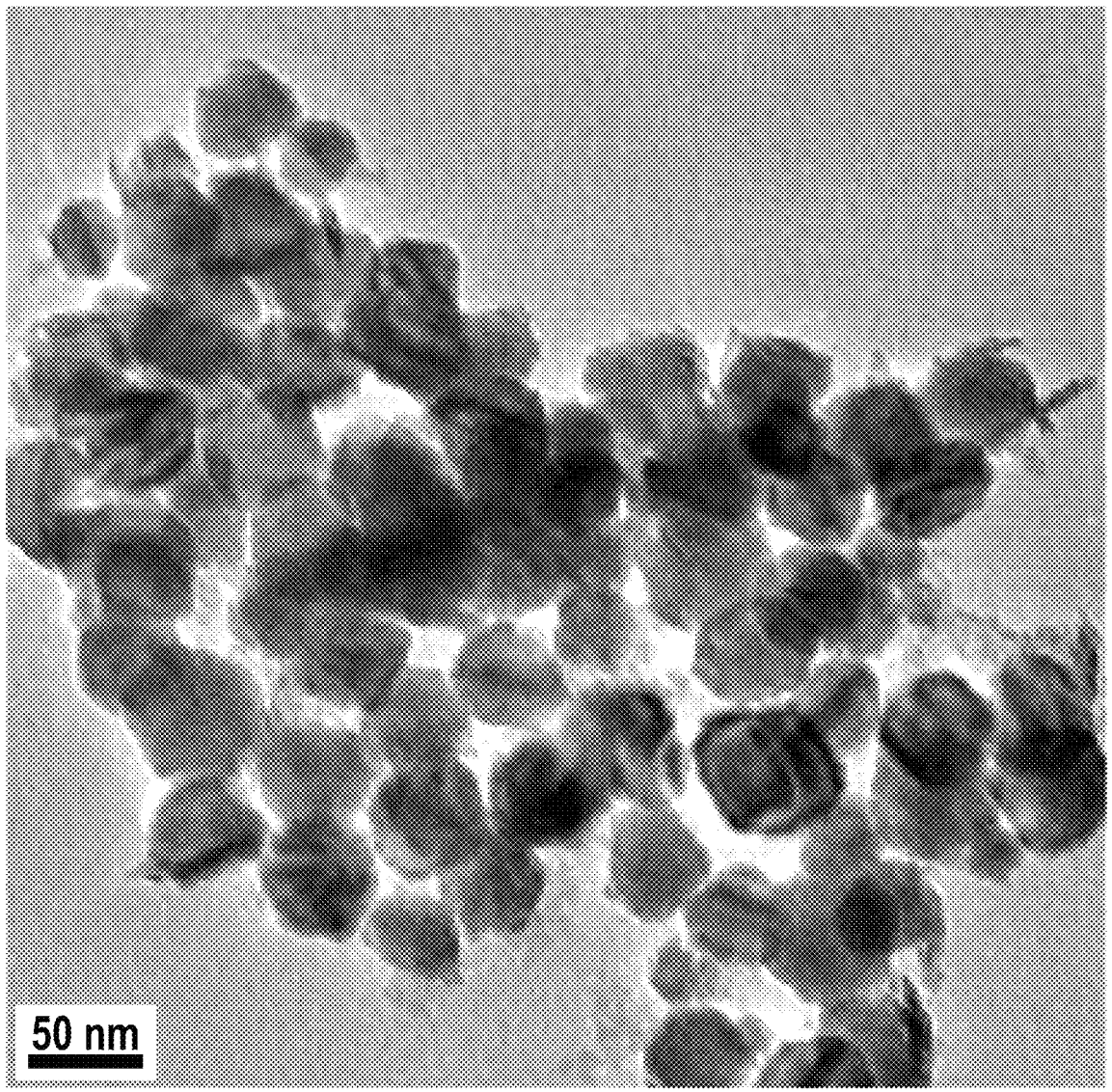
FIGS. 17B-C shows examples of transmission electron microscopy (TEM) images of Cu@$La_{0.97}Ba_{0.03}F_{2.97}$ according to some aspects of the present disclosure.
Figure 17C:
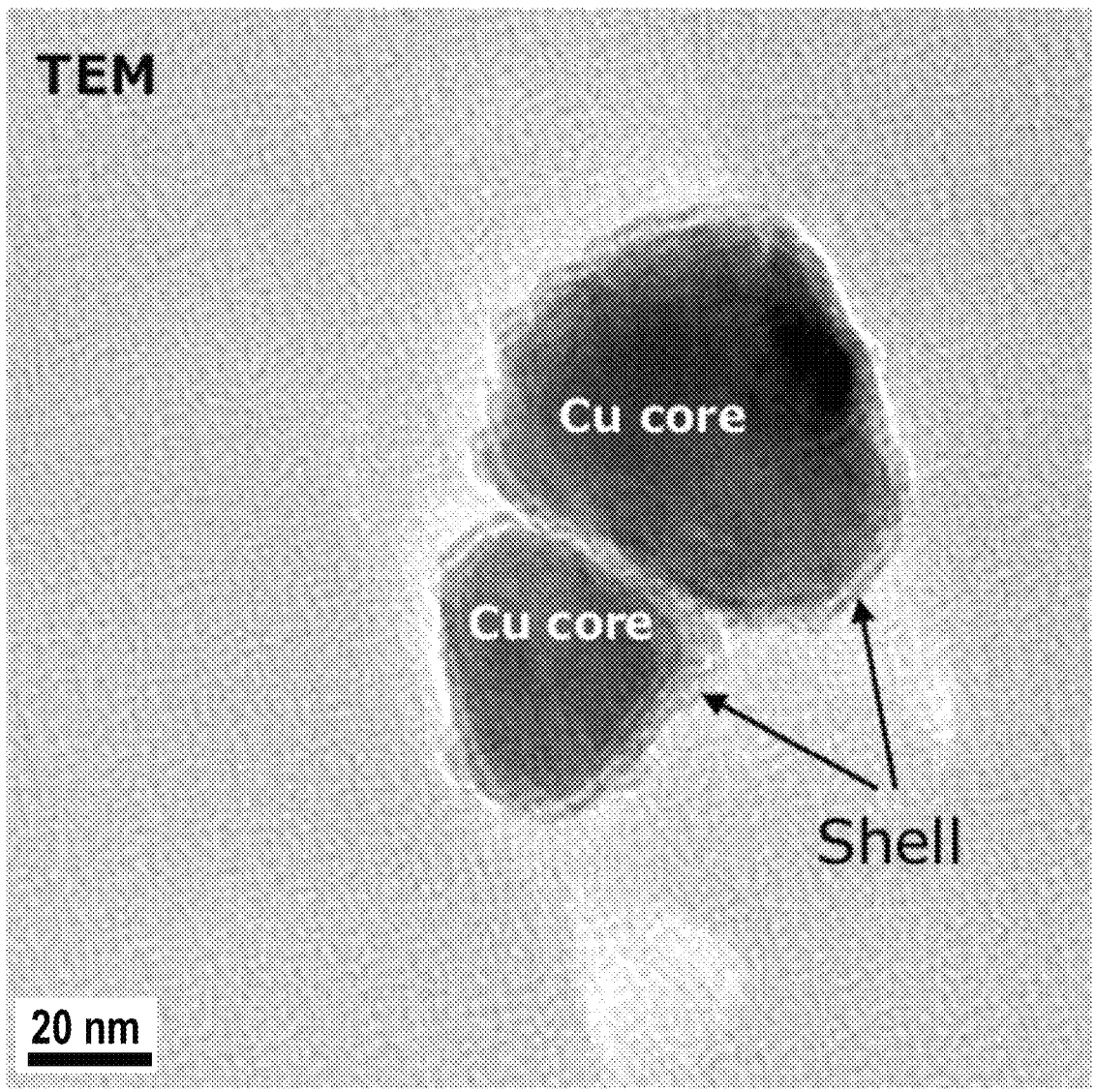
Figures 17D, 17E:
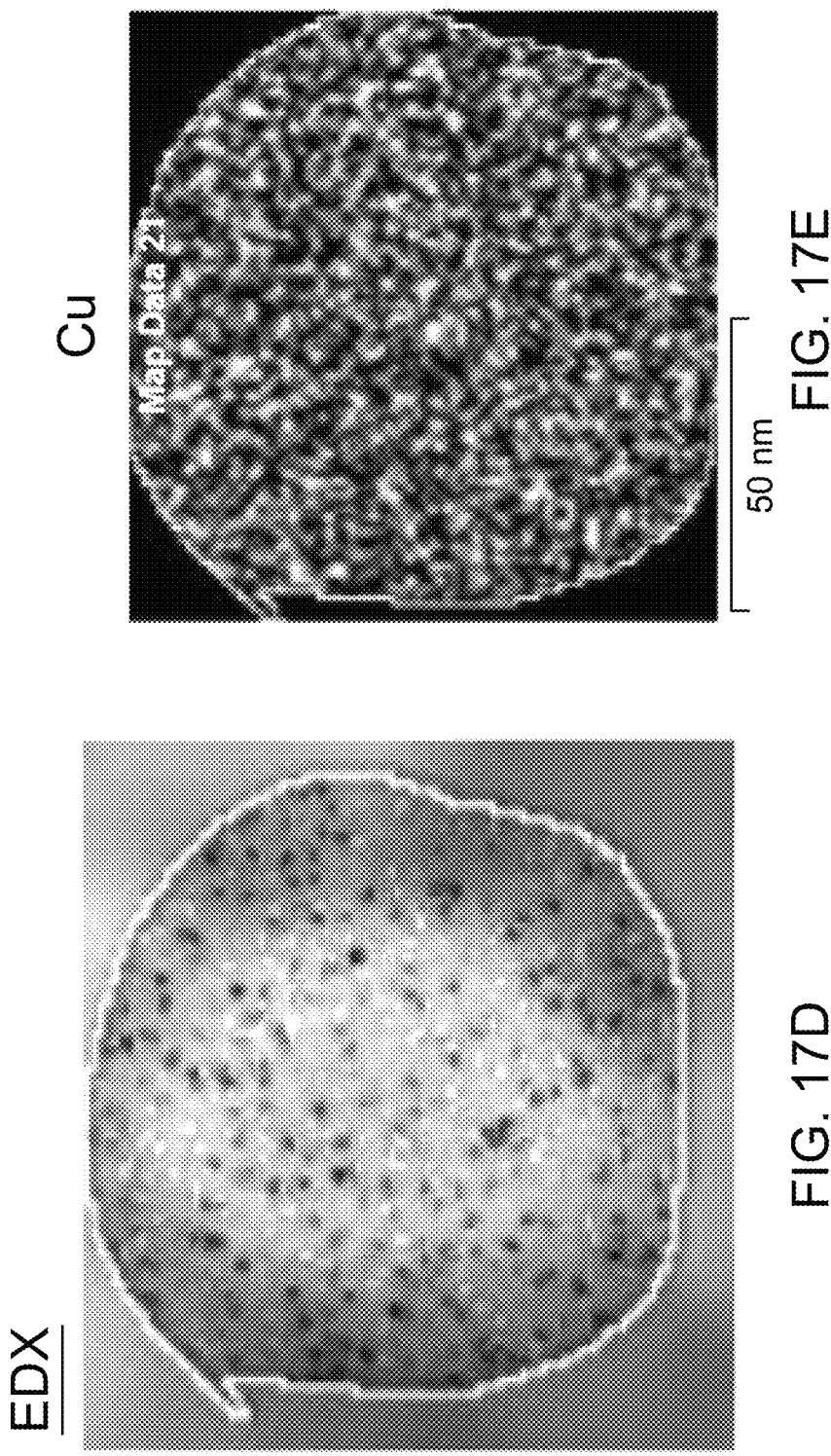
FIG. 17D shows an example of an energy dispersive x-ray (EDX) image of Cu@$La_{0.97}Ba_{0.03}F_{2.97}$ according to some aspects of the present disclosure.
FIGS. 17E-H show the component Cu, F, La, and Ba image maps, respectively.
Figures 17F, 17G, 17H:
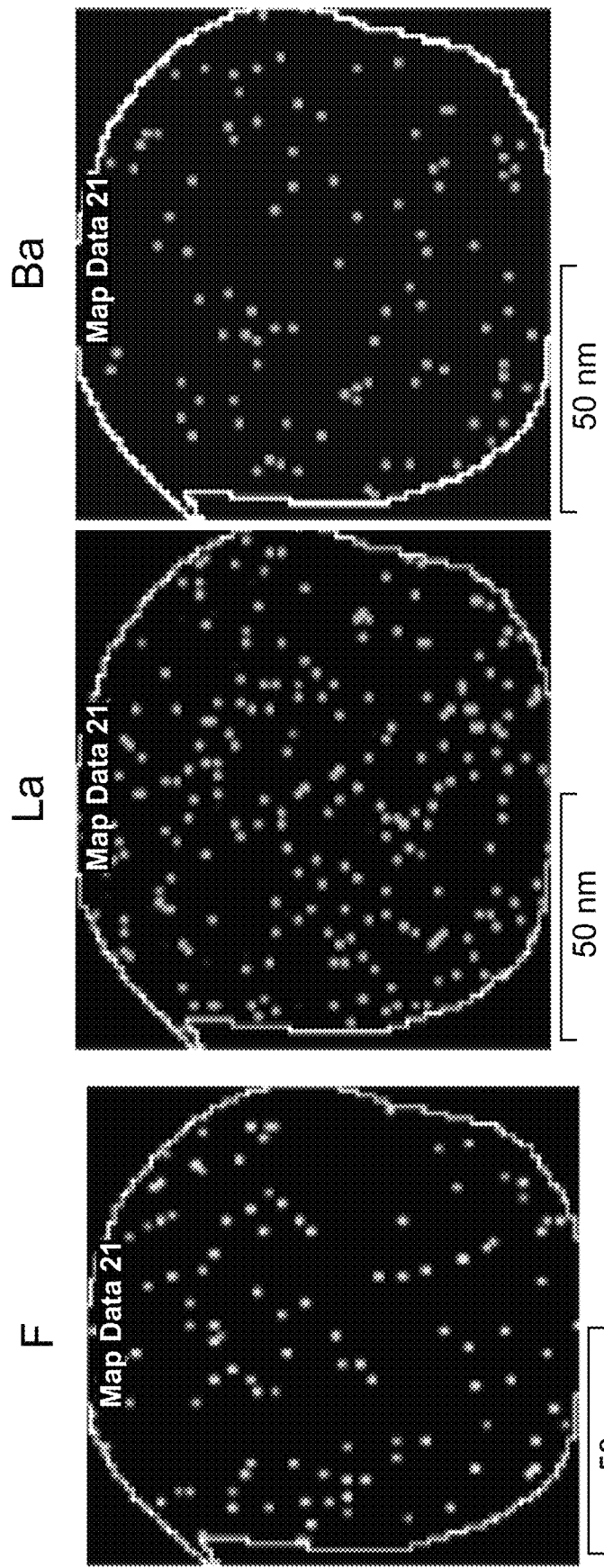
Figure 18A:
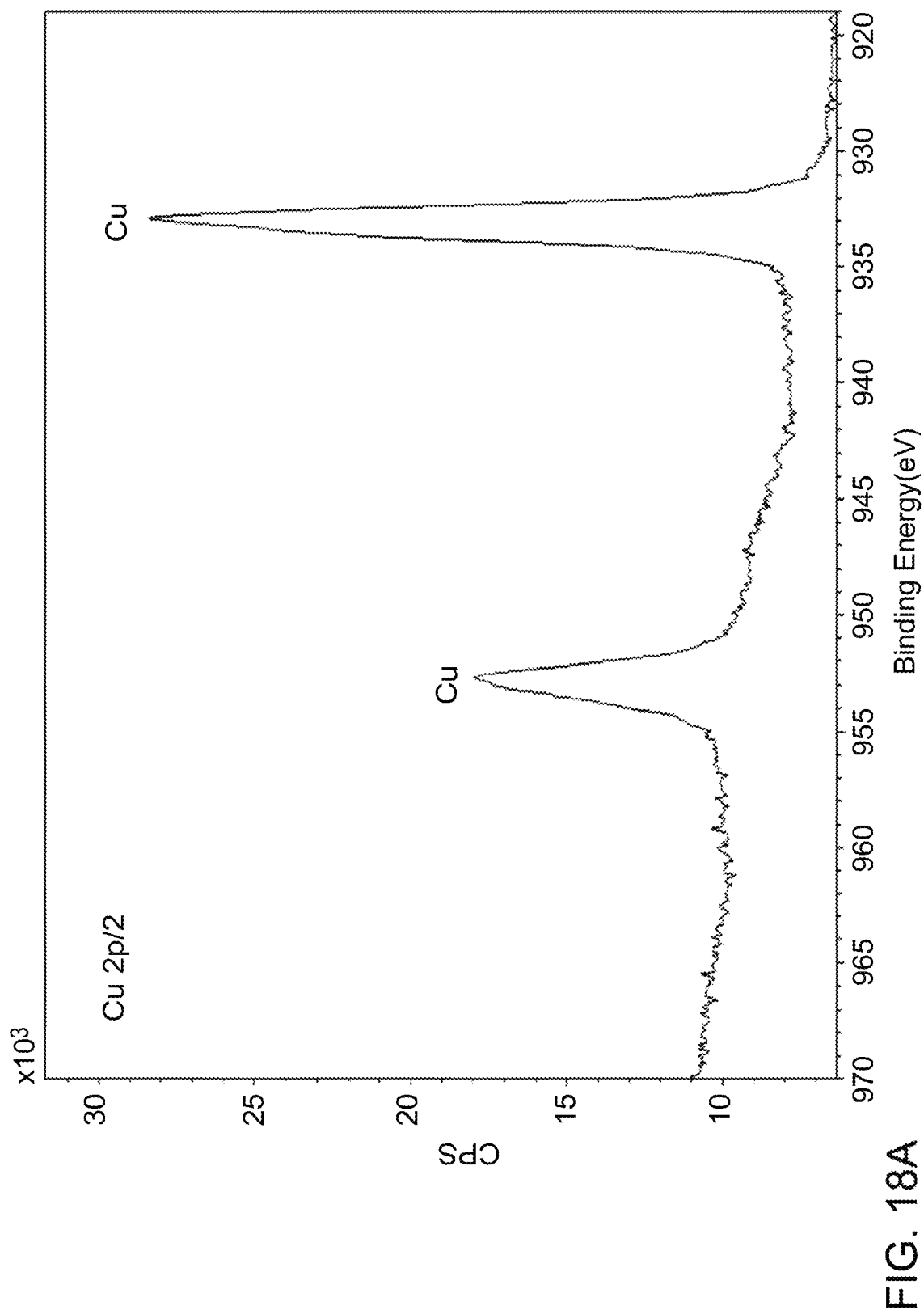
FIGS. 18A-D show x-ray photoelectron spectroscopy (XPS) spectra for Cu@$La_{0.97}Ba_{0.03}F_{2.97}$ according to some aspects of the present disclosure.
Figure 18B:
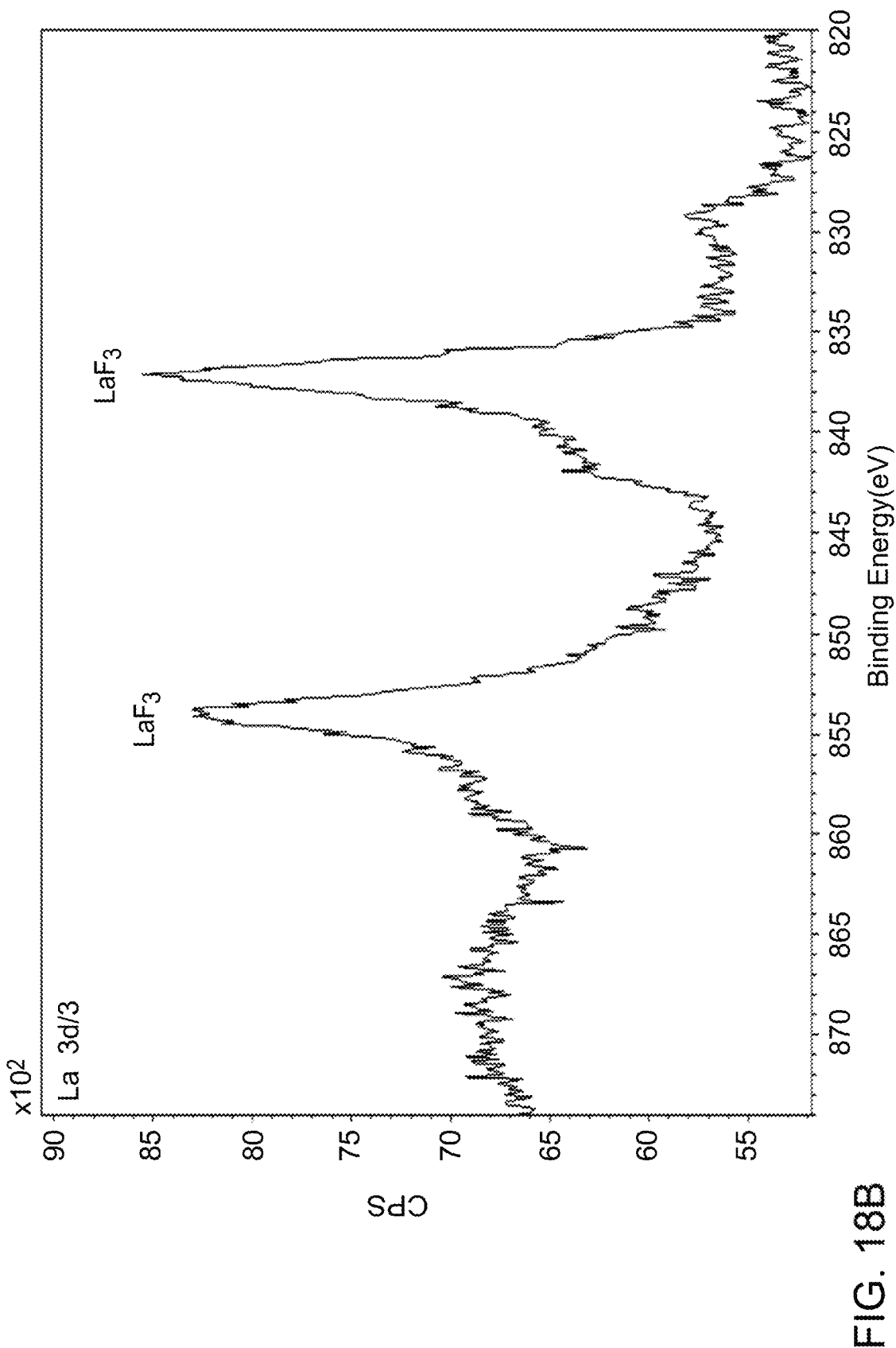
Figure 18C:
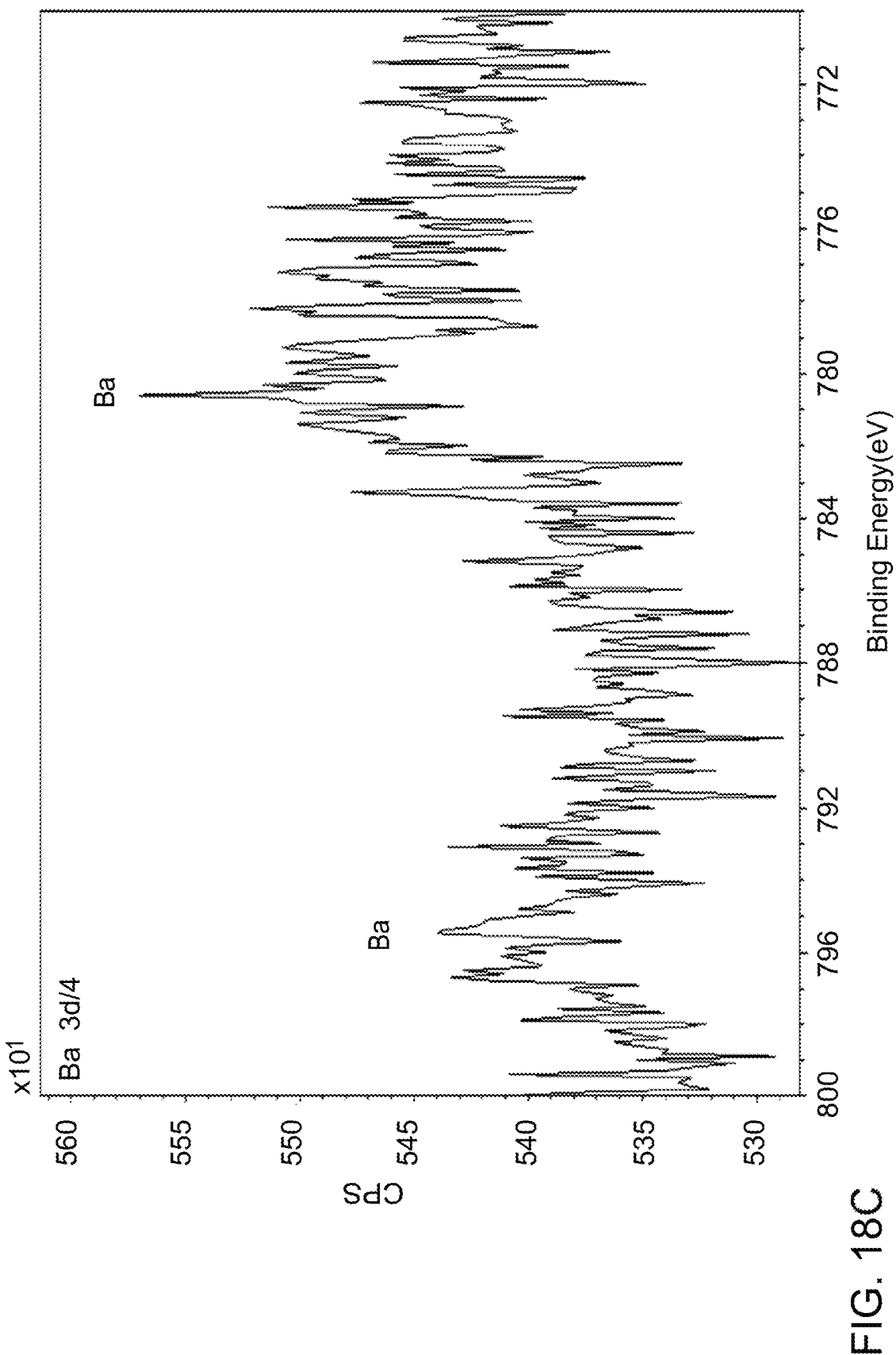
Figure 18D:
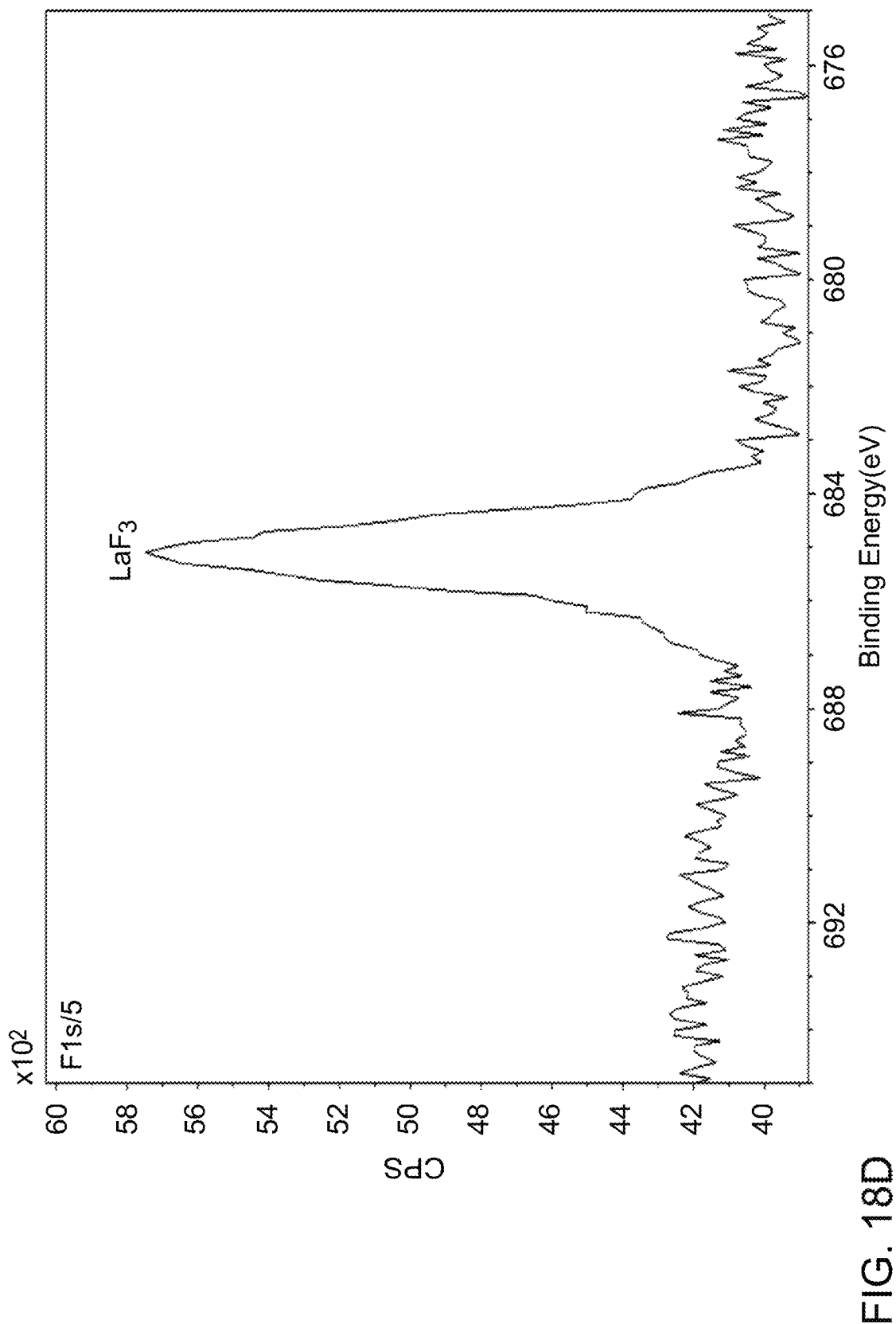

Core-shell nanoparticles with shells of the formula $Cu@Ba_xLa_{1-x}F_3$, are shown schematically in FIG. 16; $Cu@LaF_3$ is included for comparison. Initially, the copper nanoparticle core may be up to about 50 nm in diameter and the $LaF_3$ or $Ba_xLa_{1-x}F_3$, coating may be about 5 nm thick. The $CuF_2$ layer that forms on the Cu core during battery charging can grow to a thickness of about 3 nm in $Cu@LaF_3$ nanoparticles. However, by doping in Ba into the $LaF_3$ shell, the $CuF_2$ layer can grow to a greater thickness.

Ionic conducity of the $LaF_3$ is pretty low, especially at room temperature. It is only around $10^{-8.5}$ S/Cm, limiting F anions transfer. However, including a Ba dopant in the $LaF_3$ shell (i.e., making $Cu@Ba_xLa_{1-x}F_{3-x}$) increases the conductivity of the shell. It has been reported that the conductivity of $LaF_3$ increases 100 times upon Ba doping; see, e.g., M. Anji Reddy and M. Fichtner, Batteries based on fluoride shuttle, J. Mater. Chem. 2011, 21, 17059-17062, which is incorporated herein by reference in its entirety. The high ionic conductivity benefits $CuF_2$ production during charge, resulting in capacity improvement.

Figure 19:
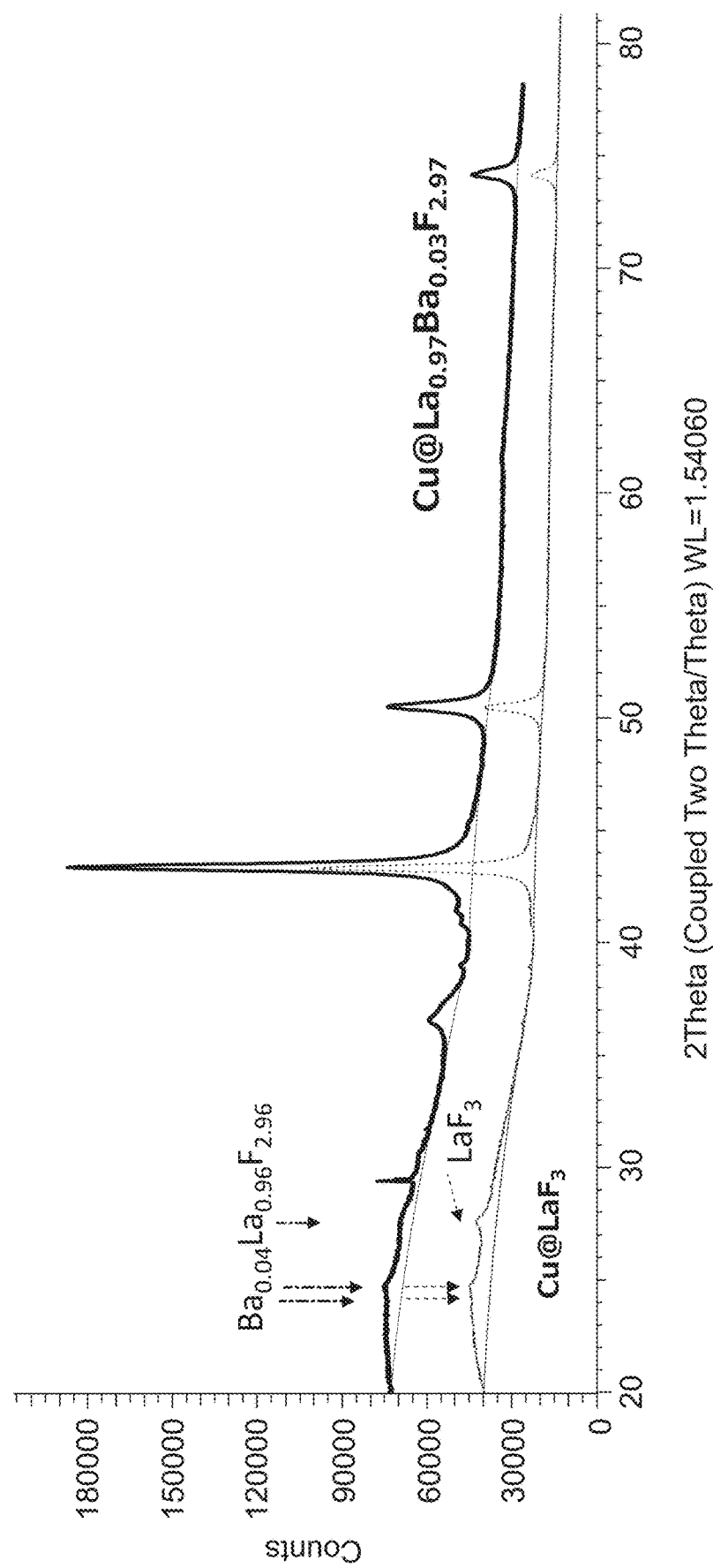
FIG. 19 shows XRD spectra for Cu@$LaF_3$ and Cu@$La_{0.97}Ba_{0.03}F_{2.97}$ according to some aspects of the present disclosure.

SEM, TEM, and EDX images of exemplary $Cu@Ba_xLa_{1-x}F_3$, nanoparticles are included in FIGS. 17A-H. XPS can be used to determine the composition of each element. FIGS. 18A-D shows representative XPS spectral data for a core@shell nanoparticle comprising Cu (64.83%), La (14.68%), Ba (0.28%), F (20.21%), where the shell itself comprises La (41.75%), Ba (0.79%), F (57.46%), confirming that the nanoparticles are $Cu@La_{0.97}Ba_{0.03}F_{2.97}$. XRD spectra of $Cu@LaF_3$ and $Cu@La_{0.97}Ba_{0.03}F_{2.97}$ are shown in FIG. 19.

Figure 20A:
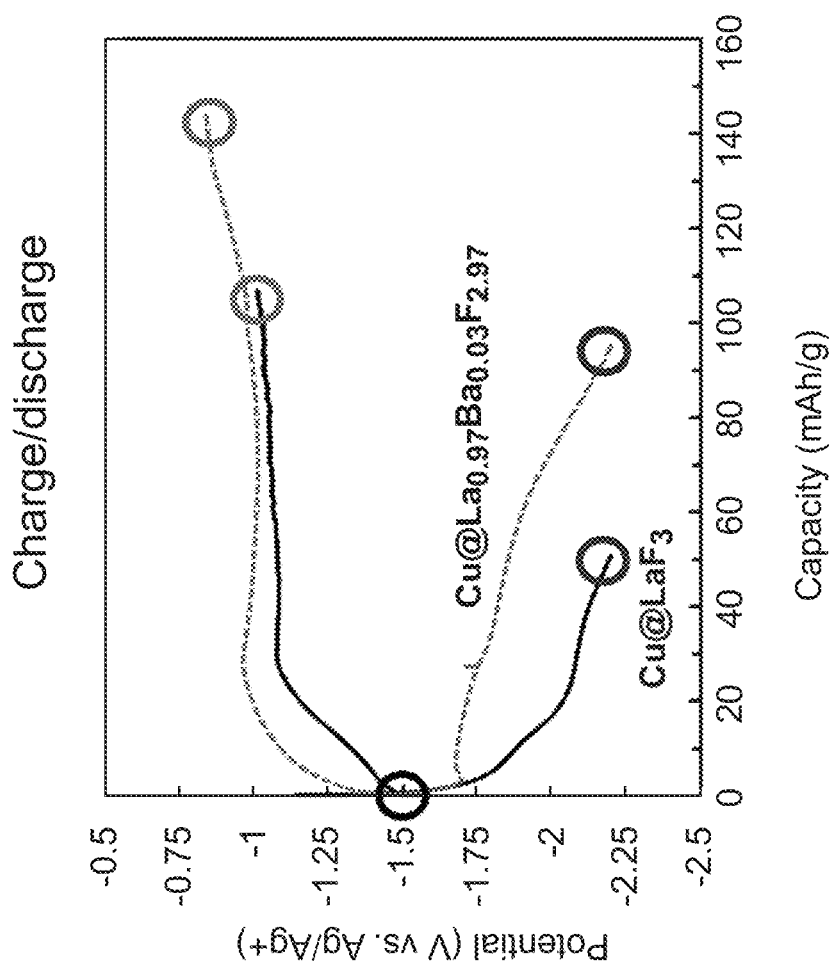
FIG. 20A shows the voltage profile of the first charge-discharge cycle of a Cu@$LaF_3$ electrode or a Cu@$Ba_xLa_{1-x}F_3$, electrode, compared to the Ag/$Ag^+$ reference electrode, according to some aspects of the present disclosure.
Figure 20B:
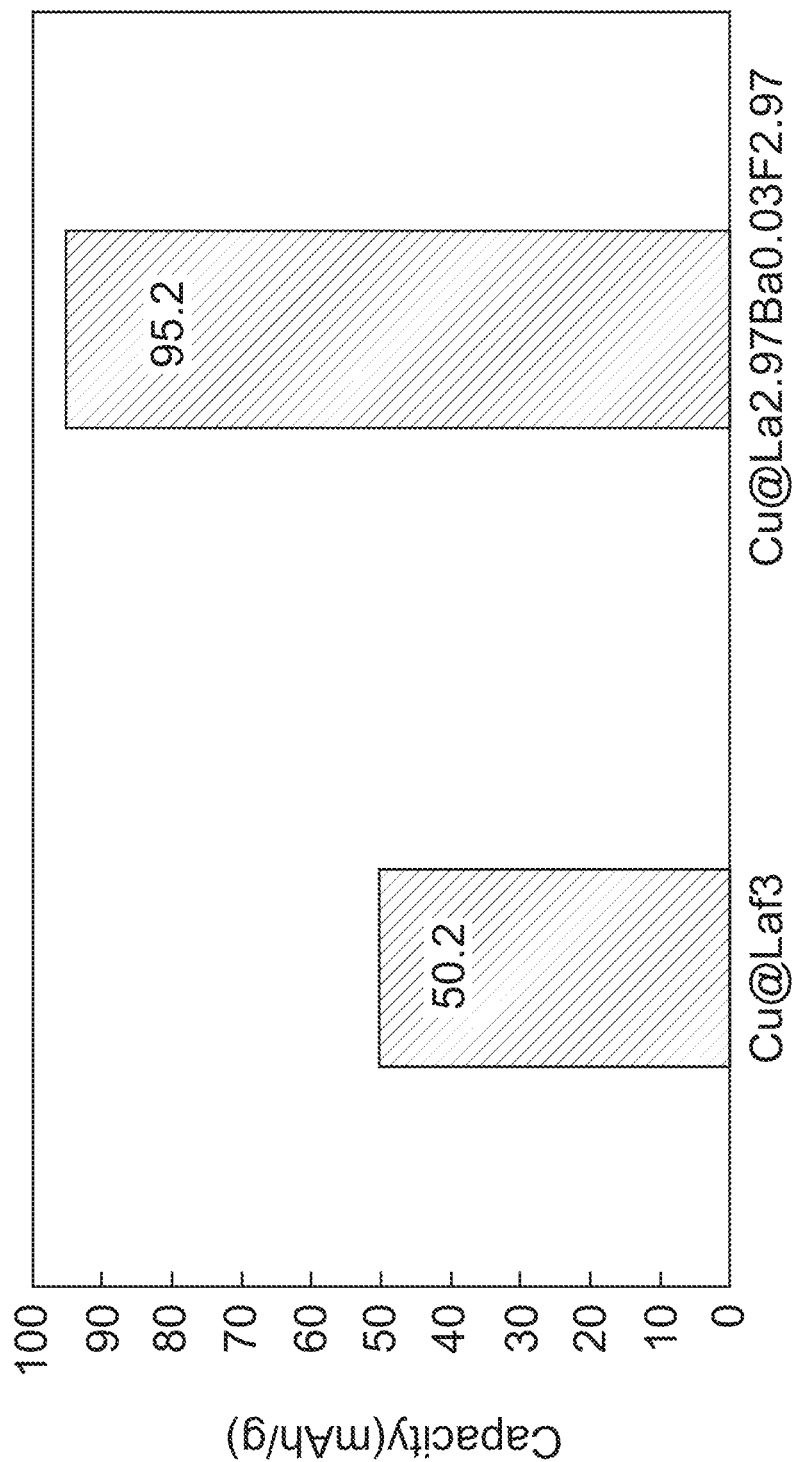
FIG. 20B shows a comparison of the capacity achieved for Cu@$LaF_3$ and for Cu@$La_{0.97}Ba_{0.03}F_{2.97}$ according to some aspects of the present disclosure.

FIGS. 20A-20B demonstrate the capacity improvement achieved upon Ba-doping according to some aspects of the present disclosure. FIG. 20A shows the voltage profile of the first charge-discharge cycle of a $Cu@LaF_3$ electrode or a $Cu@Ba_xLa_{1-x}F_{3-x}$ electrode, compared to the Ag/Ag+ reference electrode. The capacity delivery of the Ba-doped electrode reaches 95.2 mAh/g compared to only 50.2 mAh/g for $Cu@LaF_3$ (FIG. 20B). Thus, Ba-doping of the $LaF_3$ shell nearly doubles the capacity. With Ba doping, the ionic conductivity of the $LaF_3$ shell is improved about 100 times; see, e.g., M. Anji Reddy and M. Fichtner, Batteries based on fluoride shuttle, J. Mater. Chem. 2011, 21, 17059-17062, which is incorporated herein by reference in its entirety. Fluoride ion can more readily travel through the shell to react with Cu to form $CuF_2$, and the amount of $CuF_2$ formation directly determines the capacity of the battery. The more $CuF_2$ that is formed, the higher the capacity of the battery. Therefore, the utilization of Cu can be nearly doubled by Ba-doping of the $LaF_3$ shell.

Figure 20C:
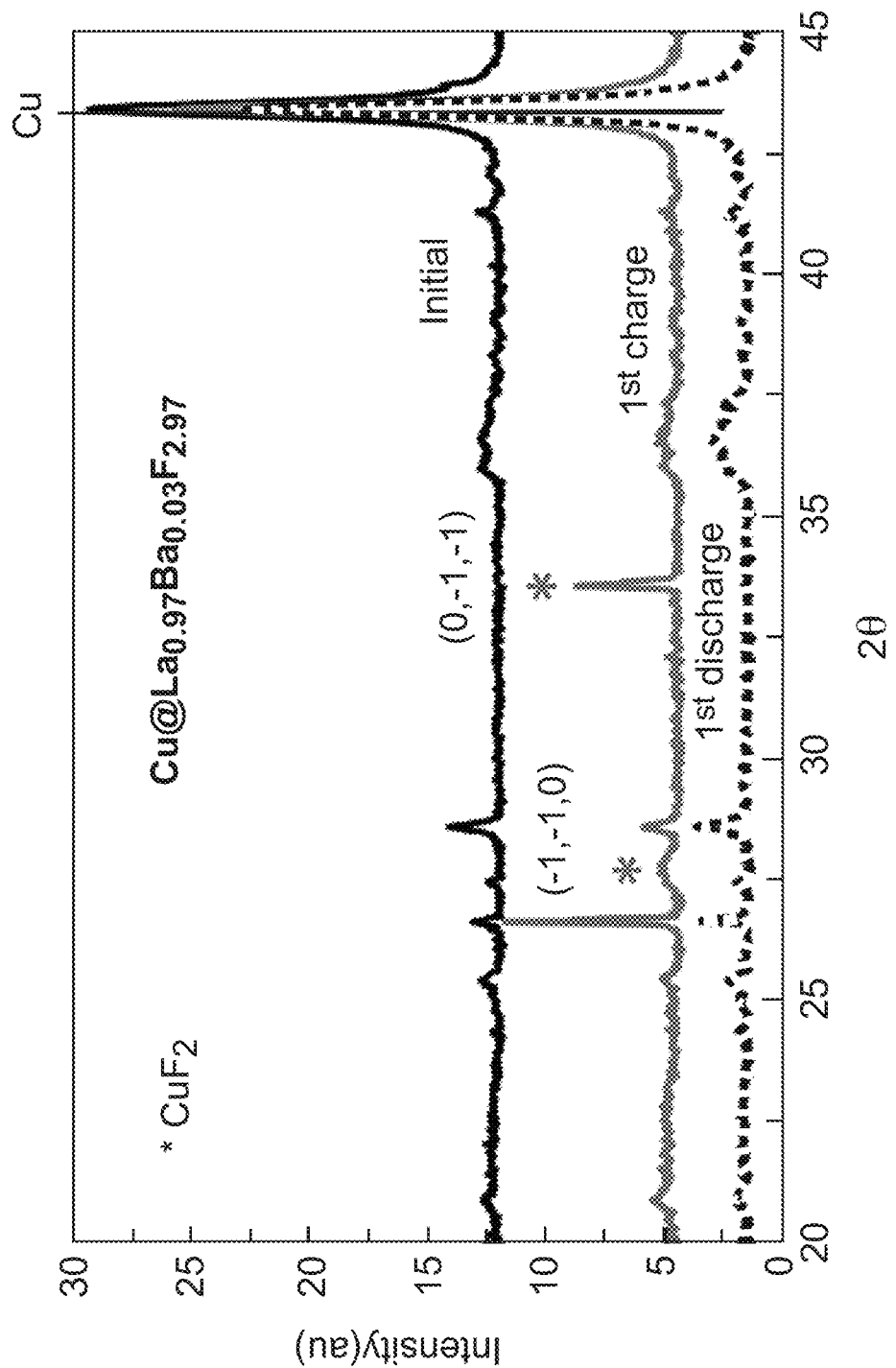
FIG. 20C shows XRD spectra of Cu@$La_{0.97}Ba_{0.03}F_{2.97}$ in initial condition and after a first charge and a subsequent first discharge, according to some aspects of the present disclosure.
Figure 20D:
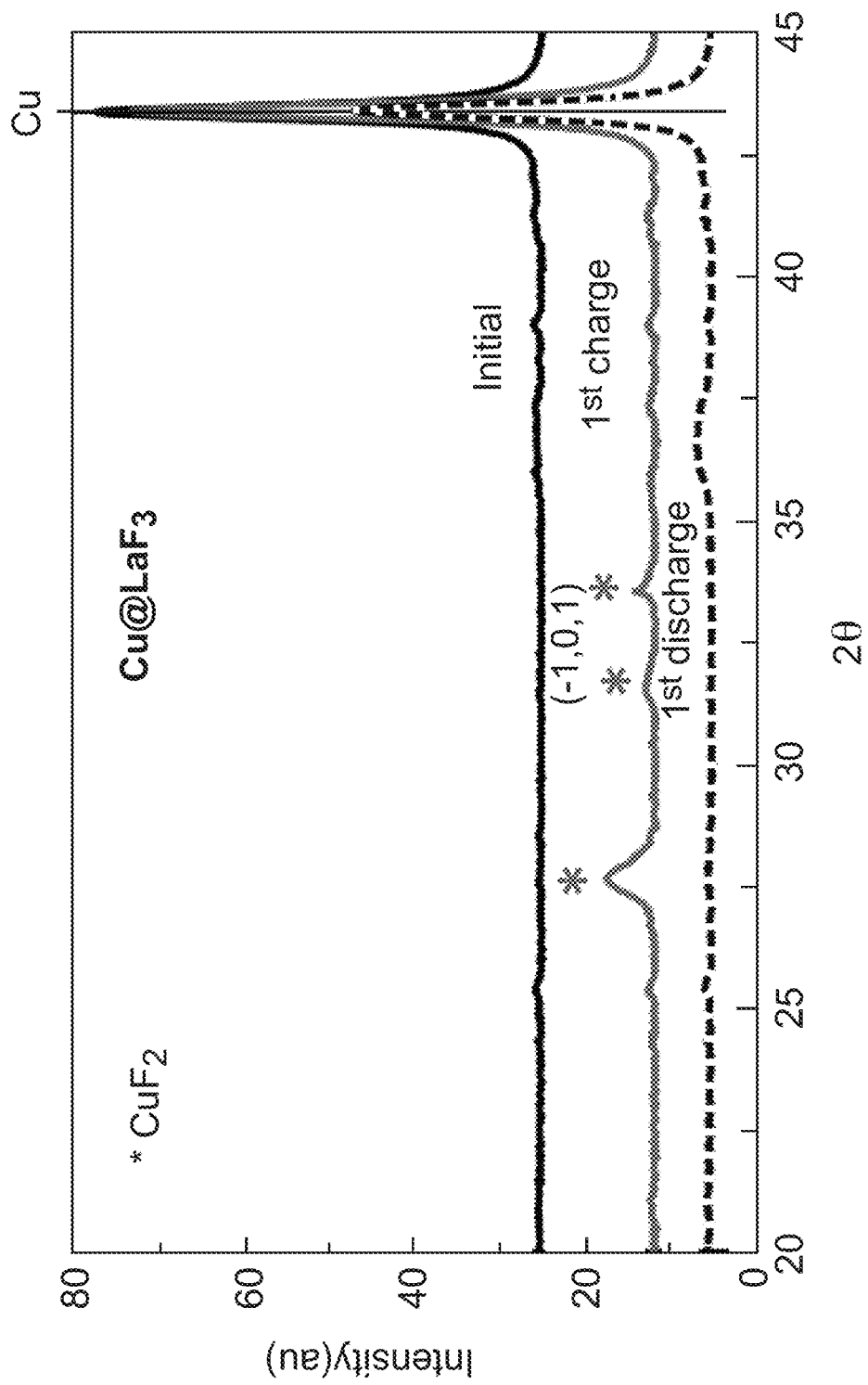
FIG. 20D shows XRD spectra of Cu@$LaF_3$ in initial condition and after a first charge and a subsequent first discharge, according to some aspects of the present disclosure.

In addition, FIGS. 20C and 20D show XRD spectra of $Cu@La_{0.97}Ba_{0.03}F_{2.97}$ and $Cu@LaF_3$ in initial condition, i.e., in an electrode before a first use, and then after a first charge and a subsequent first discharge, respectively. $CuF_2$ can be formed after $1^{st}$ charge and then reduced to Cu after $1^{st}$ discharge. FIGS. 20C and 20D indicate that Cu can be cycled in liquid electrolytes with the two types of shells.

Cu is a good cathode material for a fluoride shuttle battery because Cu is a cheap, light metal and has high capacity (theoretical capacity of 843.5 mAh/g). However, the major challenge to its use, is that Cu can not be charged to form $CuF_2$ in a liquid electrolyte/cell due to Cu dissolution. For $Cu@LaF_3$, the $LaF_3$ shell effectively prevents Cu from dissolution during charge/discharge. As a result, Cu can be charged to $CuF_2$ during charge, and $CuF_2$ can be reduced to Cu during discharge. But its capacity is low due to low ionic conductivity of $LaF_3$. With a Ba-doped shell (e.g., $La_{0.97}Ba_{0.03}F_{2.97}$), the ionic conductivity of the shell can be improved 100 times, i.e., the shell has low resistance. F ion is easier to go through the shell so that more Cu can be fluorinated to $CuF_2$ during charge. Capacity is increased by double compared to the undoped $LaF_3$ shell. With Ba-doped shell, $CuF_2$ can be detected after charge. $CuF_2$ is reduced to Cu after discharge. It can be confirmed that Cu is rechargeable in liquid cell and that Cu utilization can be improved with Ba-doped shell.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. An electrochemically active structure, comprising:
a core having an exterior surface,
wherein the core comprises an active material, and
wherein the active material comprises at least one nanoparticle, and
a fluoride-containing shell at least partially surrounding the exterior surface,
wherein the fluoride-containing shell comprises a first metal and a second metal, and the first metal is barium.

2. The electrochemically active structure of claim 1, wherein the at least one nanoparticle is selected from the group consisting of iron nanoparticles, cobalt nanoparticles, nickel nanoparticles, copper nanoparticles, lead nanoparticles, alkaline earth metal nanoparticles, and combinations thereof.

3. The electrochemically active structure of claim 1, wherein the at least one nanoparticle comprises copper nanoparticles.

4. The electrochemically active structure of claim 1, wherein the fluoride-containing shell is directly attached to the core.

5. The electrochemically active structure of claim 1, wherein the fluoride-containing shell is spaced from the core so as to define a void space therebetween.

6. The electrochemically active structure of claim 1, wherein the second metal is lanthanum.

7. The electrochemically active structure of claim 6, wherein the barium and the lanthanum are present in a molar ratio of barium to lanthanum of x to 1-x, such that a sum of the moles of barium and the moles of lanthanum in an empirical formula of the fluoride-containing shell is 1, and
wherein x is about 0.03 to about 0.15.

8. The electrochemically active structure of claim 7, wherein x is about 0.03.

9. An electrochemically active structure, comprising:
a core having an exterior surface,
wherein the core comprises an active material, and
wherein the active material comprises at least one nanoparticle, and
a fluoride-containing shell at least partially surrounding the exterior surface,
wherein the fluoride-containing shell comprises a first metal and a second metal, and the first metal is a divalent or tetravalent metal cation.

* * * * *